US012396917B1

(12) United States Patent
Liu et al.

(10) Patent No.: US 12,396,917 B1
(45) Date of Patent: Aug. 26, 2025

(54) SYSTEM, APPARATUS, AND METHOD FOR CONTROL OF AN ADULT DEVICE BASED ON USER ACTIONS

(71) Applicant: HYTTO PTE. LTD, Singapore (SG)

(72) Inventors: Dan Liu, Singapore (SG); Jilin Qiu, Singapore (SG)

(73) Assignee: HYTTO PTE. LTD, Singapore (SG)

( * ) Notice: Subject to any disclaimer, the term of this patent is extended or adjusted under 35 U.S.C. 154(b) by 0 days.

(21) Appl. No.: 18/646,182

(22) Filed: Apr. 25, 2024

(51) Int. Cl.
*A61H 19/00* (2006.01)

(52) U.S. Cl.
CPC ............. *A61H 19/32* (2013.01); *A61H 19/34* (2013.01); *A61H 19/44* (2013.01); *A61H 2201/1207* (2013.01); *A61H 2201/5015* (2013.01); *A61H 2201/503* (2013.01); *A61H 2201/5092* (2013.01); *A61H 2201/5097* (2013.01)

(58) Field of Classification Search
None
See application file for complete search history.

(56) References Cited

U.S. PATENT DOCUMENTS

| | | | | |
|---|---|---|---|---|
| 11,801,196 | B1 | 10/2023 | Liu | |
| 2015/0022328 | A1* | 1/2015 | Choudhury | G06F 1/163 340/12.5 |
| 2015/0328082 | A1* | 11/2015 | Jiang | A61H 23/02 600/38 |
| 2016/0022533 | A1* | 1/2016 | Makower | A61H 23/00 601/46 |
| 2019/0175441 | A1* | 6/2019 | Urbani | A61H 19/32 |
| 2020/0219614 | A1* | 7/2020 | Bjørkmann | H04L 63/0421 |
| 2020/0315909 | A1* | 10/2020 | Cambridge | A61H 1/00 |
| 2021/0298989 | A1* | 9/2021 | Pounders | A61H 23/00 |
| 2023/0039784 | A1* | 2/2023 | Sloan | A61H 19/00 |
| 2023/0252775 | A1 | 8/2023 | Lee | |

* cited by examiner

*Primary Examiner* — Thaddeus B Cox
(74) *Attorney, Agent, or Firm* — Keefe IP Law, PLLC

(57) ABSTRACT

A method of interactive control, implemented by a user interactive device is disclosed. The method includes, in response to an analog sexual stimulation operation performed by a user, generating a first control command associated with at least one actual sexual stimulation action of an adult toy. The analog sexual stimulation operation is configured as an analog representation of the at least one actual sexual stimulation action of the adult toy. The method also includes sending the first control command to the adult toy, the first control command causing the adult toy to follow the analog sexual stimulation operation to perform the corresponding at least one actual sexual stimulation action.

20 Claims, 14 Drawing Sheets

SYSTEM, APPARATUS, AND METHOD FOR CONTROL OF AN ADULT DEVICE BASED ON USER ACTIONS

FIELD OF THE INVENTION

The present disclosure generally relates to a system, apparatus, and method for control of an adult device, and more particularly to a system, apparatus, and method for control of an adult device based on user actions.

BACKGROUND OF THE INVENTION

Adult devices such as adult toys can often be controlled by a user device such as a smartphone or tablet. The user device is typically used to control attributes of adult toy operation such as a speed of a toy's operation.

Users often use their personal devices to adjust settings of adult toys. For example, fixed control buttons are often used to control an operation of adult toys. Such adjustment of manual settings can be repetitive and monotonous for users. Often users will repeat the same or similar settings each time they use the adult toys. Also, the use of user devices to control adult toys is often nonintuitive, which typically increases the monotony and burden associated with controlling attributes of a toy's operation.

Accordingly, a need in the art exists for an efficient and convenient technique for controlling an adult toy in a way that avoids monotony and burden.

The exemplary disclosed system and method are directed to overcoming one or more of the shortcomings set forth above and/or other deficiencies in existing technology.

SUMMARY OF THE INVENTION

In one exemplary aspect, the present disclosure is directed to a method of interactive control, implemented by a user interactive device. The method includes, in response to an analog sexual stimulation operation performed by a user, generating a first control command associated with at least one actual sexual stimulation action of an adult toy. The analog sexual stimulation operation is configured as an analog representation of the at least one actual sexual stimulation action of the adult toy. The method also includes sending the first control command to the adult toy, the first control command causing the adult toy to follow the analog sexual stimulation operation to perform the corresponding at least one actual sexual stimulation action.

In another aspect, the present disclosure is directed to an interactive control system. The system includes an interactive control module, comprising computer-executable code stored in non-volatile memory; and a memory for storing instructions and a processor for executing the instructions. The computer-executable code, when operating on the processor, causes the system to, in response to an analog sexual stimulation operation performed by a user, generate a first control command associated with at least one actual sexual stimulation action of an adult toy. The analog sexual stimulation operation is configured as an analog representation of the at least one actual sexual stimulation action of the adult toy. The computer-executable code, when operating on the processor, also causes the system to send the first control command to the adult toy, the first control command causing the adult toy to follow the analog sexual stimulation operation to perform the corresponding at least one actual sexual stimulation action.

DETAILED DESCRIPTION AND INDUSTRIAL APPLICABILITY

Figure 1:
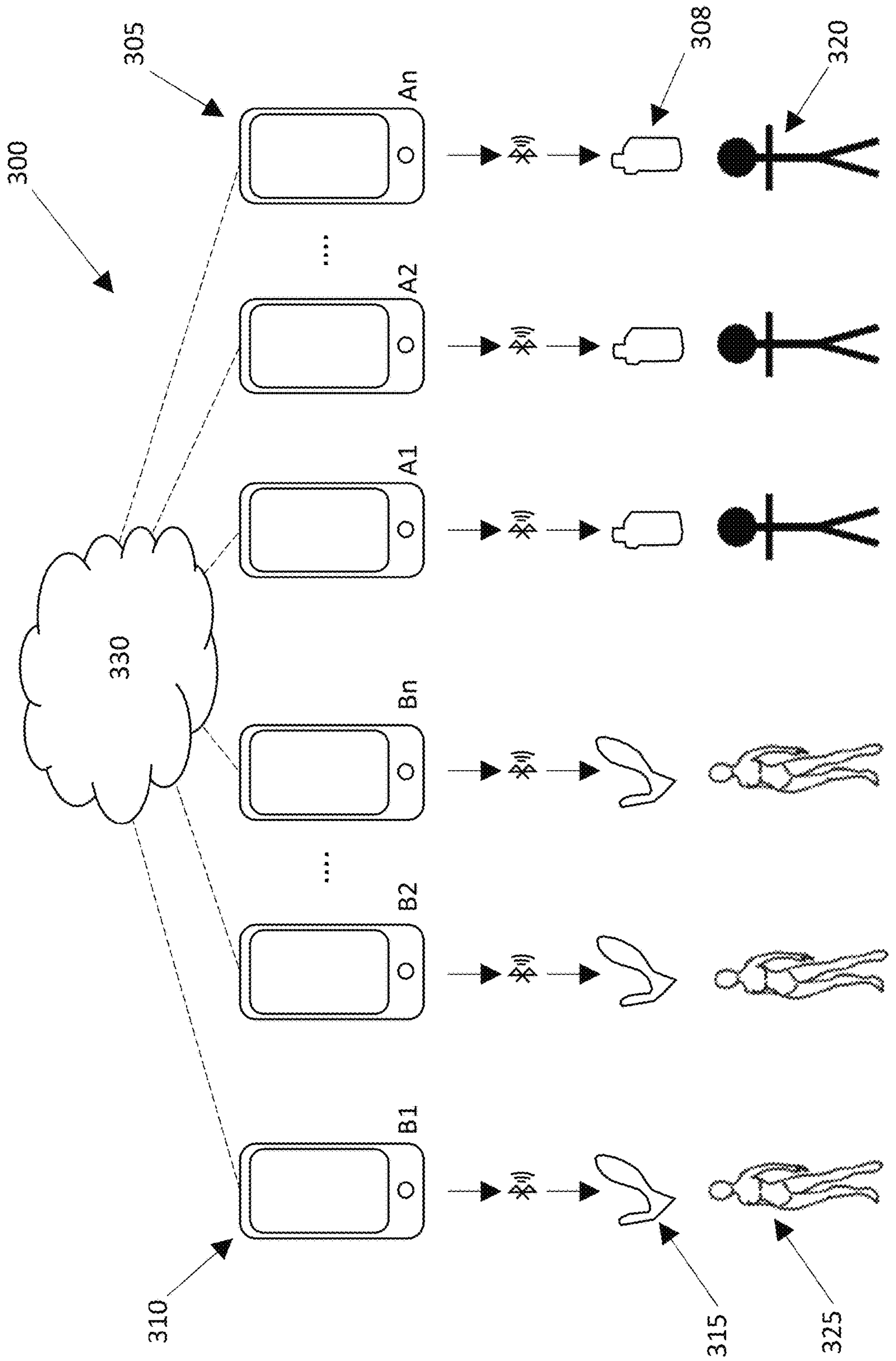
FIG. 1 is a schematic illustration of an exemplary system of the present invention.

FIG. 1 illustrates an exemplary system 300 for controlling devices such as adult devices (e.g., adult toys). In at least some exemplary embodiments, system 300 may be a system for controlling an adult device based on user actions. In at least some exemplary embodiments, a device such as an adult toy may be controlled to follow and make corresponding actions based on a user's analog operations (e.g., user actions such as gesture operation, limb action, or head action). Users can thereby intuitively control the adult toy according to their own desires. For example, when a user bends a finger or slides a finger up and down, the adult toy may follow these actions (e.g., movements and/or gestures) so that the adult toy performs similar actions such as, for example, bending and/or sliding.

In at least some exemplary embodiments, the "analog sexual stimulation operation" can be understood to include at least various movements or gestures used by the user to provide analog (e.g., real) stimulation actions that can be performed by the adult toy, so as to control the adult toy to follow the user's operation to perform the corresponding actual sexual stimulation action (e.g., so as to achieve the sexual stimulation effect expected by the user). System 300 can detect and analyze the user's body movements and operation gestures and other relevant analog operations, and convert these analog operations into control instructions for the adult toy, so as to allow for the adult toy to perform the actual sexual stimulation action matching the user's operations. As an illustrative example, the term "analog sexual stimulation operation" can be understood to mean at least that the user imitates or reproduces relevant real stimulation actions that can be performed by the adult toy through his or her own actions or gestures, and that these actions are recognized by the system and converted into control signals for the adult toy, so that the toy is able to perform the corresponding actual sexual stimulation action. In addition to simulating the actual sexual stimulation action, the exemplary disclosed analog operation may comprise multiple dimensions of the intention, rhythm, force, and/or direction of the actual sexual stimulation action to be reproduced or imitated. After the user's actions are captured and processed, system 300 may adjust the response of the adult toy according to the characteristics of these actions in order to achieve the desired sexual stimulation effect. Thus, the "analog sexual stimulation operation" may emphasize the authenticity and intuitiveness of the user's actions, and the ability of system 300 to parse and reproduce those actions so as to provide the user with a more natural, near-authentic, personalized, and/or interactive sexual stimulation experience.

In at least some exemplary embodiments, the actual sexual stimulation action may include the relevant authentic stimulation actions that the adult toy is capable of making, which may include actual physical stimulation of the user's sexual organ, such as vibration, sliding, squeezing, and/or other suitable stimulation. The design and implementation of these actions may provide analog real-life sexual stimulation situations, such as sexual acts between partners, self-satisfaction behaviors, and/or other suitable situations. By precisely controlling the form, rhythm, intensity and other elements of the action, adult toys may simulate the real physiological stimulation experience of a user in terms of tactile sensation, so as to satisfy the user's physiological desires and psychological expectations. In addition to direct physical stimulation, the actual sexual stimulation action may also include adult toys in a specific context of action changes, such as simulating a specific sexual position when a contact mode, angle, and/or other characteristics of position changes. These actions may be designed to create a sensory atmosphere that matches a specific sexual situation, helping the user to immerse themselves in a kind of virtual or imagined sexual environment and enhance the overall sensory experience and emotional engagement for the user. In scenarios that support two- or multi-user operation, the actual sexual stimulation actions may also analog the stimulation patterns that occur during two- or multi-party interactions. For example, analog sexual stimulation operations between users may be processed by system 300 to drive their respective adult toys to perform the corresponding actual sexual stimulation action as if the users were actually physically interacting with each other. This interactive simulation may strengthen the social function of the adult toys, allowing users to feel a relatively deeper emotional connection and shared experience during use.

In at least some exemplary embodiments, there may be a mapping relationship between the analog sexual stimulation operation and the actual stimulation action (the association between the analog sexual stimulation operation and the actual stimulation action may also be realized in other ways, such as analyzing the analog sexual stimulation operation of the user by a relevant machine learning algorithm and outputting the actual stimulation action associated with the analog sexual stimulation operation). For example, the analog sexual stimulation operation may be an operation made by the user through gestures, body movements, control elements in the operator interface, and/or any other suitable manner for example as described herein (e.g., they may be abstract expressions or simulations of real sexual stimulation action by the user). These operations may be recognized by system 300 and converted into control commands, which may then drive the adult toy to perform the corresponding "actual sexual stimulation action". In other words, each simulation operation performed by the user can correspond to at least one or at least a group of actual sexual stimulation action of the adult toy, and a mapping relationship between the two can be established in advance (e.g., so that when a simulation stimulation operation is detected, the actual stimulation action that the user wants the toy to perform can be determined, and thus the relevant control instructions for the adult toy can be generated). For example, the operational parameters (e.g., operation position, speed, amplitude, direction, force, time, and/or any other suitable parameter) contained in the analog sexual stimulation operation may be analyzed by system 300 and can be used to control the corresponding operational parameters (e.g., stimulation position, amplitude, distance traveled, intensity, speed, frequency, and/or any other suitable parameter) of the actual stimulation action. By changing these parameters of the simulation operation, the user can directly affect the action process of the actual stimulation action of adult toys, and attain (e.g., realize) the fine tuning of the stimulation effect. For example, through the analog sexual stimulation operation, the user can intuitively and naturally control the adult toy, as in the direct manipulation of the actual stimulation. This intuitive (e.g., highly intuitive), personalized control may enhance the user's sense of participation and immersion, allowing the user to adjust the stimulation mode and intensity according to the user's personal preferences and wishes, thus enhancing the pleasure and satisfaction of using adult toys. The analog sexual stimulation operation may also allow the user to finely adjust the action parameters of the adult toy (e.g., position, amplitude, speed, intensity, frequency, and/or any other suitable parameter), which may provide (e.g., realize) a precise control of sexual stimulation. Users can adjust the stimulation mode of the toy in real time or near real time according to their own sensitivity points, comfort level, and arousal cycle, in order to achieve a desired stimulation effect.

In at least some exemplary embodiments, the exemplary disclosed system, apparatus, and method may provide a method of interactive control that may be implemented by a user interactive device. The method may include generating a first control command associated with at least one actual sexual stimulation action of an adult toy, in response to an analog sexual stimulation operation performed by a user. The analog sexual stimulation operation may be configured to provide (e.g., provide an analog of) at least one actual stimulation action of the adult toy. The method may also include sending the first control command to the adult toy, which causes the adult toy to follow the analog sexual stimulation operation to achieve a corresponding actual sexual stimulation action.

As illustrated in FIG. 1, system 300 may include one or more male user devices 305, one or more female user devices 310, one or more male accessories 308, and one or more female accessories 315. For example, system 300 may include a plurality of male user devices 305, a plurality of male accessories 308, a plurality of female user devices 310, and a plurality of female accessories 315. Data such as image data, audio data, and/or control data may be transferred between male user devices 305, male accessories 308, female user devices 310, and female accessories 315. System 300 may also include one or more auxiliary devices 328 as illustrated in FIG. 2 and further described below.

Returning to FIG. 1, system 300 may include any desired number of male user devices 305 (e.g., A1, A2, . . . . An). Male user device 305 may be any suitable device for interfacing with other components of system 300 such as a computing device (e.g., user interface). For example, male user device 305 may be any suitable user interface for receiving input and/or providing output (e.g., image data) to a male user 320. Male user device 305 may include a camera and a microphone. Male user device 305 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 16 and 17). For example, male user device 305 may include a touchscreen device of a smartphone or handheld tablet. For example, male user device 305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on male user device 305 and utilized by male user 320.

Figure 2:
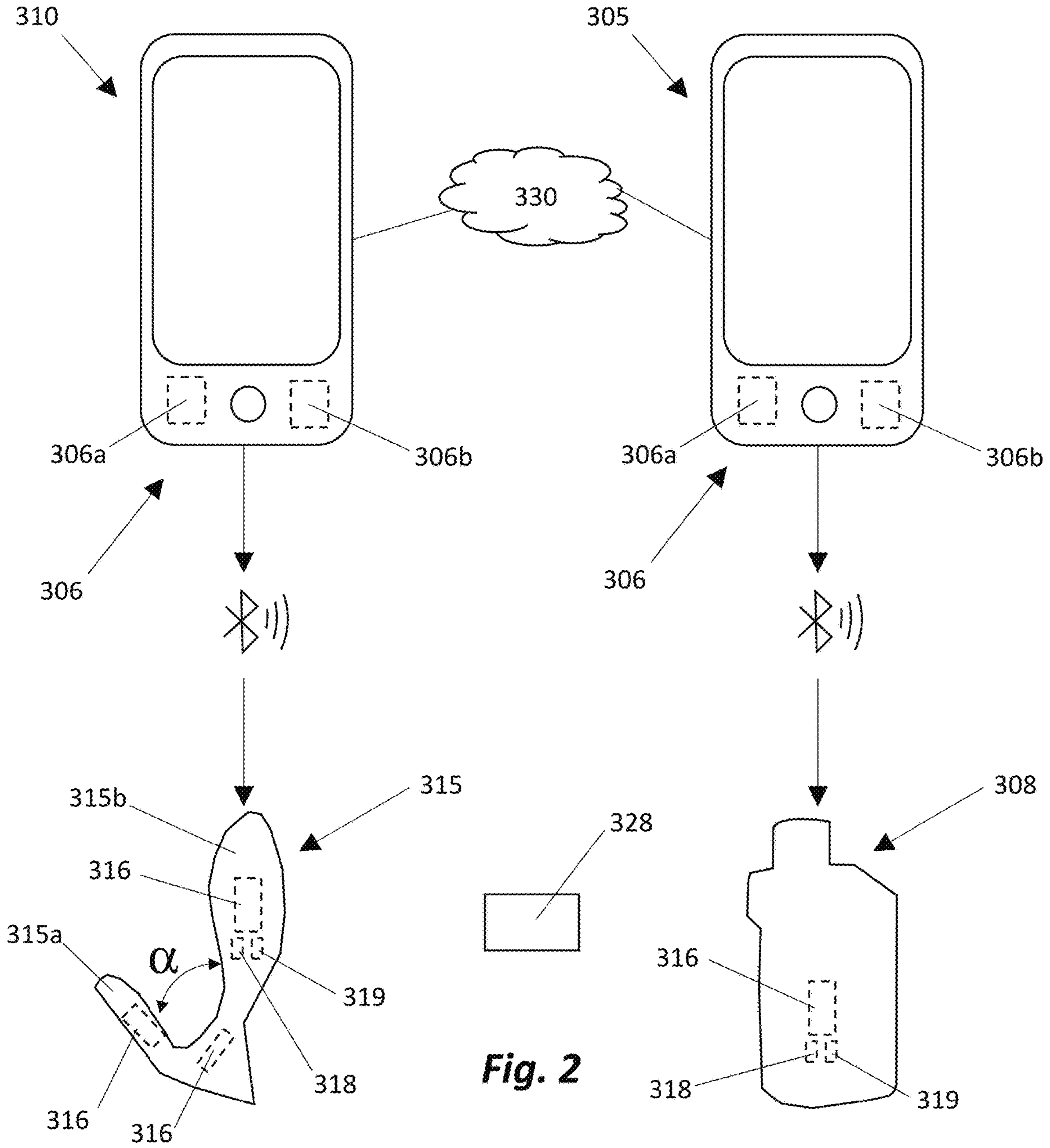
FIG. 2 is a schematic illustration of exemplary components of the exemplary system of FIG. 1.

As illustrated in FIG. 2, male user device 305 may include a sensor array 306. In at least some exemplary embodiments, sensor array 306 may include one or more sensors integrated or built into the exemplary disclosed user device (e.g., male user device 305) such as, for example, a mobile phone, a pad, or a wearable device. Sensor array 306 may include any suitable sensors for use with system 300 such as, for example, a location sensor 306*a* and a movement sensor 306*b*. Location sensor 306*a* may include a GPS device, a Galileo device, a GLONASS device, an IRNSS device, a BeiDou device, and/or any other suitable device that may operate with a global navigation system.

Movement sensor 306*b* may include any suitable components for sensing motion (e.g., motion amplitude), velocity, and/or acceleration. Movement sensor 306*b* may include an acceleration sensor. Movement sensor 306*b* may include a gyroscope. For example, movement sensor 306*b* may include a displacement sensor, a velocity sensor, and/or an accelerometer. For example, movement sensor 306*b* may include components such as a servo accelerometer, a piezoelectric accelerometer, a potentiometric accelerometer, and/or a strain gauge accelerometer. Movement sensor 306*b* may include a piezoelectric velocity sensor or any other suitable type of velocity or acceleration sensor.

System 300 may include any desired number of female user devices 310 (e.g., B1, B2, . . . . Bn). Female user device 310 may be similar to male user device 305. For example, female user device 310 may be any suitable user interface for receiving input and/or providing output (e.g., image data) to a female user 325. Female user 325 may operate female user device 310 to record and transfer image (e.g., video) and audio data to one or more male users 320 and/or other female users 325 via a network 330. Additional exemplary disclosed devices and/or users of any desired gender may also be included in the exemplary disclosed system (e.g., a non-binary user and/or a non-binary user device and/or non-binary accessory similar to the examples described herein).

Female accessory 315 may be any suitable accessory for use by female user 325 (e.g., when female user 325 is imaged by female user device 310). For example, female accessory 315 may be a prop that is used by female user 325 while female user 325 is being imaged (e.g., a video or pictures of female user 325 are being recorded and/or transmitted in real-time to be viewed by male user 320 and/or another female user 325). For example, female accessory 315 may be a device used for erotic stimulation (e.g., a sex aid or a “sex toy”). Female accessory 315 may be a sexual simulation device that may be associated with a given female user 325 and respective female user device 310 of that given female user 325. In at least some exemplary embodiments, female accessory 315 may be a massaging apparatus for human genitalia (e.g., a vibrator). For example, female accessory 315 may be any suitable device for use in a video or pictures recorded by female user device 310, which may be an erotic video or erotic pictures). In at least some exemplary embodiments, female accessory 315 may be a tool or other indicator that may be used in video or pictures recorded by female user device 310 such as a sign providing information such as location or time information, a surveillance tool used by female user 325, and/or any other suitable tool or accessory that may be used while female user device 310 is recording a video or pictures of female user 325. For example, female user 325 may be an erotic model using female accessory 315 that may be an erotic device, a technician or laborer using female accessory 315 that may be a tool or work device specific to a desired application, an operative using female accessory 315 that may be a surveillance tool or a part of a weapon system being recorded by female user device 310, and/or any other desired role using any suitable female accessory 315.

Female accessory 315 may include one or more driving components such as one or more motors 316. Motor 316 may include an electric motor. Motor 316 may include a server motor, a stepper motor, a brushless motor, or any other suitable type of motor. Motor 316 may include any suitable vibration motor or haptic motor such as, for example, a mini vibrator motor. Motor 316 may include a low voltage motor. Motor 316 may include a pager motor or a coin vibration motor. Motor 316 may include a linear resonant actuator or an eccentric rotating mass vibration motor. Motor 316 may be a reversible electric motor (e.g., a reversible electric motor). Motor 316 may be a unidirectional motor (e.g., a one-way motor). Motor 316 may be powered by any suitable power source, such as a battery (e.g., a nickel-metal hydride battery, a lithium-ion battery, an ultracapacitor battery, a lead-acid battery, and/or a nickel cadmium battery), an electric power source (e.g., a transformer connected to a plug that may plug into an outlet), and/or any other suitable energy source. Female accessory 315 may include a controller 319 that may be any suitable computing device for controlling an operation of motor 316 and a communication device 318. Controller 319 may, for example, include components similar to the components described below regarding FIG. 16. Controller 319 may include for example a processor (e.g., micro-processing logic control device) or board components. Controller 319 may control one or more motors 316 based on input data and/or commands (e.g., control commands) received from male user device 305 and/or female user device 310 via a network 330 and/or communication device 318 (e.g., transferred directly to communication device 318 by any suitable component of system 300). Motor 316 may be controlled by controller 319 to vibrate female accessory 315 at a desired level or strength, perform a suction operation at a desired level or strength using female accessory 315 (e.g., using female accessory 315 as a suction device), rotate or swing female accessory 315 at a desired speed or amount, contract or expand female accessory 315 by a desired amount, cause female accessory 315 to perform an inhalation action, and/or cause female accessory 315 to perform any other suitable action or function.

In at least some exemplary embodiments, motor 316 may be or may include a thermal device such as a heater (e.g., or a cooler or any other suitable thermal device). Alternatively for example, a heater unit and the exemplary disclosed motor may be separately provided (e.g., installed) in the exemplary disclosed adult toy. In at least some exemplary embodiments, motor 316 may include an electric heating device such as an electric resistance heating device. Motor 316 may include a polyimide heater, a silicone rubber heater, and/or a resistive wire heater. Motor 316 may be controlled by controller 319 to heat or emit heat or warmth from female accessory 315. For example, motor 316 may cause a temperature variation of female accessory 315.

In at least some exemplary embodiments and as illustrated in FIG. 2, female accessory 315 may include a first accessory portion 315*a* and a second accessory portion 315*b* (e.g., forming for example an action implementation structure). For example, first accessory portion 315*a* and second accessory portion 315*b* may be configured to be in contact with one or more erogenous zones of a user and may be configured to be operable in the plurality of exemplary disclosed stimulation modes to induce sexual stimulation to the one or more erogenous zones of the user. A first electric motor 316 may be disposed in first accessory portion 315*a*, and a second electric motor 316 may be disposed in second accessory portion 315*b*. A motor 316 may also be disposed between first accessory portion 315*a* and second accessory portion 315*b* to provide a driving force for moving accessory portions 315*a* and 315*b* relative to each other for example as described further below. For example, motor 316 may provide a driving force, which may be transferred by any suitable transmission components disposed in and/or between first accessory portion 315*a* and second accessory portion 315*b* to make first accessory portion 315*a* and second accessory portion 315*b* move relative to each other. First accessory portion 315*a* may be a clitoral stimulation component and second accessory portion 315*b* may be a vaginal stimulation component. For example, second accessory portion 315*b* (e.g., the vaginal stimulation member) may be used to achieve vibratory stimulation, oscillating stimulation, and/or any other desired stimulation of the vagina. Also for example, first accessory portion 315*a* (e.g., the clitoral stimulation member) may be used to achieve vibratory stimulation, sucking stimulation action, and/or any other desired stimulation of the clitoris. First accessory portion 315*a* may be disposed at an angle $\alpha$ relative to second accessory portion 315*b*. Motors 316 and/or any other suitable actuator disposed in female accessory 315 may move first accessory portion 315*a* and second accessory portion 315*b* relative to each other (e.g., based on control by controller 319) so that angle $\alpha$ varies. For example, controller 319 may control angle $\alpha$ to vary as desired by female user 325 and/or another user (e.g., another female user 325 or male user 320) for example as further described herein. For example, angle $\alpha$ may be varied to iteratively decrease and increase during use of female accessory 315.

Figure 2A:
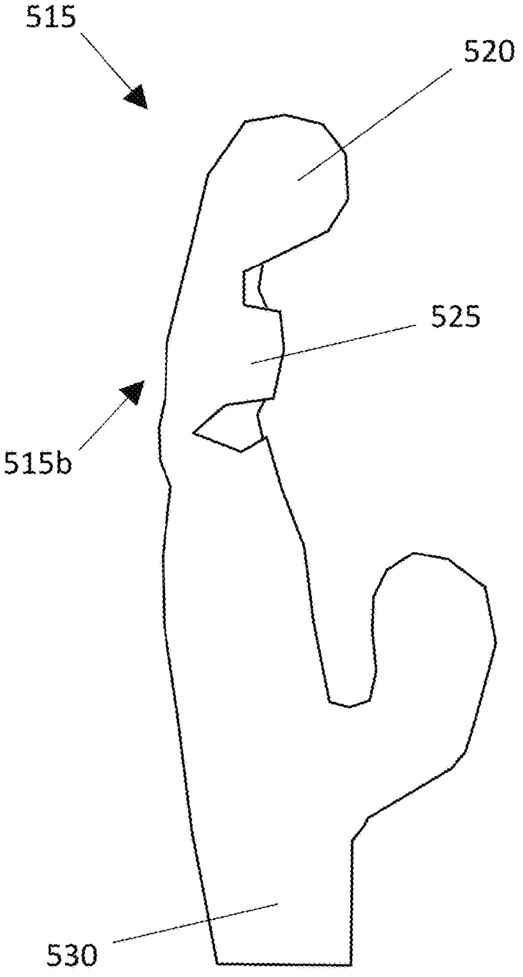
FIGS. 2A and 2B are schematic illustrations of an exemplary accessory of the exemplary disclosed system.
Figure 2B:
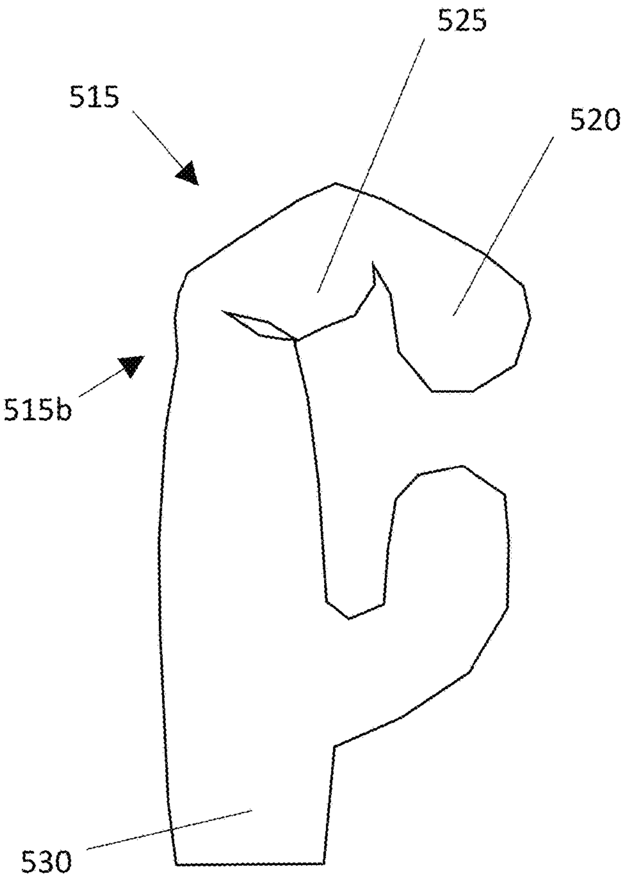

FIGS. 2A and 2B illustrate another exemplary embodiment of the exemplary disclosed female accessory. A female accessory 515 may be generally similar to female accessory 315. Female accessory 515 may include a handle 530 and a vaginal stimulation component 515*b*, which may be connected to one end of handle 530. Vaginal stimulation component 515*b* may be configured to be able to at least partially insert into a female user's vagina for sexual stimulation, and vaginal stimulation component 515*b* may be configured to rotate around one end of handle 530. Vaginal stimulation component 515*b* may move back and forth, toward and away from handle 530, when rotated. When the exemplary disclosed user interaction device responds to a user's analog sexual stimulation operation and generates a first control command (e.g., as described herein) and sends it to female accessory515, vaginal stimulation component 515*b* of female accessory 515 may make an actual sexual stimulation action following the analog sexual stimulation operation under the control of the first control command (e.g., as further described herein). For example, when the user makes an analog sexual stimulation operation similar to finger flexion and extension, vaginal stimulation component 515*b* may rotate around one end of handle 530 and approach or move away from handle 530, thereby achieving an actual sexual stimulation action similar to a finger buckle. As an example, users can use their own fingers to perform an analog sexual stimulation operation of finger movement, which is captured by the exemplary disclosed camera device (e.g., as described herein) configured by the exemplary disclosed user interaction device, and recognized by relevant image recognition techniques (e.g., as described herein). Users can also perform an analog sexual stimulation operation by manipulating the operation controls on the exemplary disclosed interface (e.g., as described herein) configured by the exemplary disclosed user interaction device (e.g., such as pulling an operation control associated with the vaginal stimulation component on the exemplary disclosed interface to move around a certain position, thus performing an analog sexual stimulation operation similar to finger clasping). As a further example, vaginal stimulation component 515*b* may include a plurality of (e.g., at least two) component segments (e.g., first component segment 520 and second component segment 525), which may be hinged and capable of performing finger-like flexion and extension movements.

Returning to FIG. 2, male accessory 308 may include components generally similar to female accessory 315 and may operate generally similarly to female accessory 315. Male accessory 308 may be a sexual simulation device that may be associated with a given male user 320 (e.g., a viewer of one or more female users 325 and/or male users 320; or a male model) and respective male user device 305 (e.g., a viewer device) of that given male user 320.

Network 330 may be any suitable communication network over which data may be transferred between one or more male user devices 305, one or more male accessories 308, one or more female user devices 310, and/or one or more female accessories 315. Network 330 may be the internet, a LAN (e.g., via Ethernet LAN), a WAN, a WiFi network, or any other suitable network. Network 330 may be similar to WAN 201 described below. The components of system 300 may also be directly connected (e.g., by wire, cable, USB connection, and/or any other suitable electromechanical connection) to each other and/or connected via network 330. For example, components of system 300 may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 17. Male user devices 305, male accessories 308, female user devices 310, and/or female accessories 315 may include any suitable communication components for communicating with other components of system 300 using for example the communication techniques described above. For example, male user devices 305 and female user devices 310 may include integrally formed communication devices (e.g., smartphone components), and male accessories 308 and female accessories 315 may each include communication device 318 that may communicate using any of the exemplary disclosed communication techniques.

In at least some exemplary embodiments, a given female accessory 315 may communicate with a given female user device 310 (e.g., a paired female user device 310) via any suitable short distance communication technique. For example, female accessories 315 (e.g., via communication device 318) and female user devices 310 may communicate via Wifi, Bluetooth, ZigBee, NFC, IrDA, and/or any other suitable short distance technique. Female accessory 315 may be an adult toy that may be connected with female user device 310 through short distance wireless communication. An application (e.g., operating using the exemplary disclosed modules) may be installed on female user device 310, the application and female user device 310 being configured to send commands to female accessory 315 to drive (e.g., actuate) female accessory 315. Male accessory 308 may communicate with male user device 305 similarly to the communication of female accessory 315 and female user device 310 described above.

System 300 may include one or modules for performing the exemplary disclosed operations. The one or more modules may include an accessory control module for controlling male accessory 308 and female accessory 315. The one or more modules may be stored and operated by any suitable components of system 300 (e.g., including processor components) such as, for example, network 330, male user device 305, male accessory 308, female user device 310, female accessory 315, and/or any other suitable component of system 300. For example, system 300 may include one or more modules having computer-executable code stored in non-volatile memory. System 300 may also include one or more storages (e.g., buffer storages) that may include components similar to the exemplary disclosed computing device and network components described below regarding FIGS. 16 and 17. For example, the exemplary disclosed buffer storage may include components similar to the exemplary storage medium and RAM described below regarding FIG. 16. The exemplary disclosed buffer storage may be implemented in software and/or a fixed memory location in hardware of system 300. The exemplary disclosed buffer storage (e.g., a data buffer) may store data temporarily during an operation of system 300.

Figure 3:
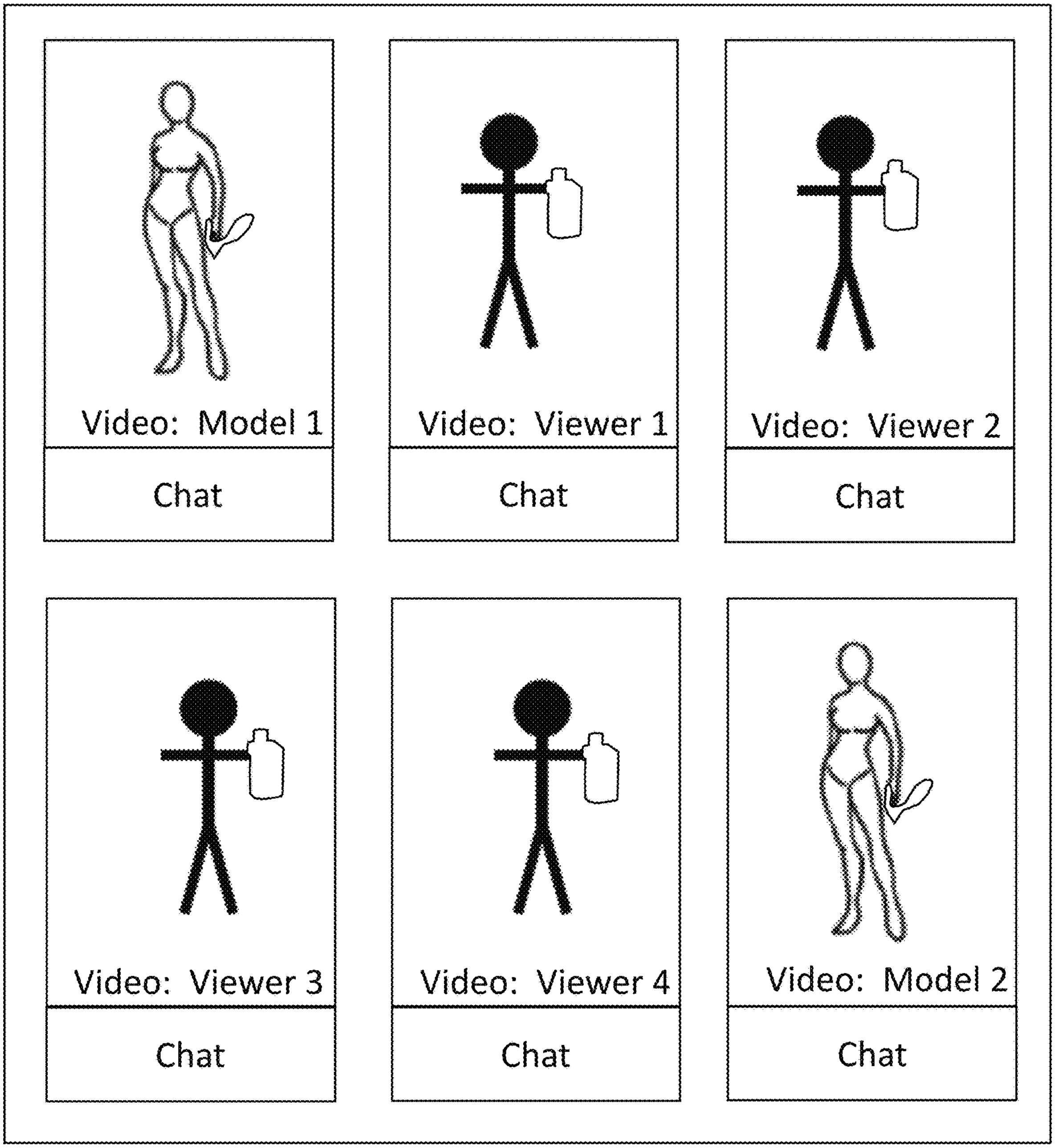
FIG. 3 is a schematic illustration of an exemplary embodiment of the exemplary disclosed system.

The one or more exemplary disclosed modules may also provide a chat room interface via one or more male user devices 305 and/or one or more female user devices 310 for use by male users 320 and female users 325. For example, video display of female user 325, one or more male users 320, and/or and a chat or messaging app (e.g., any suitable chat communication or messaging app such as, for example, text, voice, and/or video chat boxes) may be displayed to each male user 320 via male user device 305 and to each female user 325 via female user device 310. One or more male users 320 and one or more female users 325 may thereby view and chat (e.g., text, voice, and/or video chat) with each other via the one or more exemplary disclosed modules via respective male user devices 305 and female user devices 310. Male users 320 and female users 325 may thereby view, interact with, and/or chat (e.g., text, voice, and/or video chat) with other female users 325 and/or other male users 320 (e.g., and/or any other users of an gender such as non-binary users as described above or any other gender). For example, multiple text, voice, and/or video chat boxes including a plurality of male users 320 (e.g., viewers or models each having one or more male accessories 308) and/or a plurality of female users 325 (e.g., viewers or models each having one or more female accessories 315) may be displayed to each male user 320 and each female user 325 via respective male user devices 305 and female user devices 310. Male users 320 and female users 325 may thereby view and interact with other male users 320 and female users 325 that may each have one or more respective accessories (e.g., respective male accessories 308 and female accessories 315). FIG. 3 schematically illustrates an exemplary embodiment of the exemplary disclosed chat room that may be displayed to male user 320 via male user device 305 or to female user 325 via female user device 310.

Figure 4:
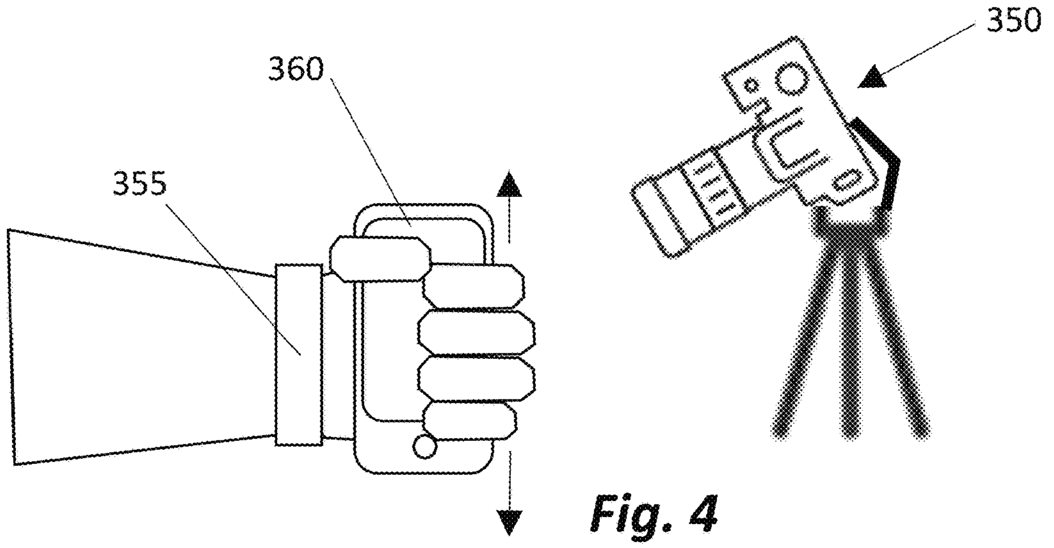
FIG. 4 is a schematic illustration of an exemplary embodiment of the exemplary disclosed system.

In at least some exemplary embodiments and as illustrated in FIG. 4, system 300 may further include an imaging device 350, a wearable device 355, and/or a gesturing object 360. Imaging device 350, wearable device 355, and/or gesturing object 360 may be used directly and/or indirectly to control an adult device (e.g., male accessory 308 and/or female accessory 315). For example, imaging device 350 may be a camera that may be used to obtain user input (e.g., data of gesturing images made by the user) by any suitable imaging technique (e.g., for example as described herein). The exemplary disclosed adult toy may be controlled by the exemplary disclosed user interaction device (e.g., wearable device 355 and/or gesturing object 360) being connected (e.g., via any suitable communication technique such as, for example, as described herein) to imaging device 350. Also for example, gesturing object 360 may be a passive object that may be imaged (e.g., and/or recognized) by imaging device 350 for use in controlling the exemplary disclosed adult device.

Imaging device 350 may be any suitable imaging device such as a camera. For example, imaging device 350 may be any suitable video camera such as a digital video camera, a webcam, and/or any other suitable camera for recording visual data (e.g., recording a video or taking pictures) and/or image recognition. Imaging device 350 may be a 3D camera. Imaging device 350 may be a headset that may be worn by a user (e.g., male user 320 or female user 325). Imaging device 350 may be a spatial computing device (e.g., a spatial computer). Imaging device 350 may utilize any suitable spatial computing features and/or techniques (e.g., similar to Apple Vision Pro). Imaging device 350 may be for example a three-dimensional video sensor or camera. One or more imaging devices 350 may include a plurality of cameras or a single camera configured to collect three-dimensional image data. In at least some exemplary embodiments, imaging device 350 may be a stereoscopic camera and/or any other suitable device for stereo photography, stereo videography, and/or stereoscopic vision. Imaging device 350 may be substantially entirely integrated into the exemplary disclosed user devices or may be a stand-alone device. In at least some exemplary embodiments, imaging device 350 may be a smartphone or tablet camera. Imaging device 350 may provide data to an exemplary image recognition module of system 300. Imaging device 350 may include one or more actuators that may adjust a position of imaging device 350 based on an operation of system 300 (imaging device 350 may also include a support or stand for supporting imaging device 350). The actuators may be for example one or more external actuators disposed at an exterior of imaging device 350 and/or one or more integrated actuators that are completely or partially integrated into imaging device 350 (e.g., disposed and/or integrated within an interior of imaging device 350). In at least some exemplary embodiments, the actuators may be internally integrated into imaging device 350 and may turn optical components and/or move lenses of imaging device 350 within a housing of imaging device 350 to zoom in and out at different features or points within a variable field of view of imaging device 350 (e.g., zoom in and out on points or features of a user and/or exemplary disclosed accessories). The actuator may also be one or more external and/or internally-integrated mechanical actuators configured to mechanically turn imaging device 350 and move lenses of imaging device 350 to focus in and out at desired objects (e.g., points and/or features of a user and/or an accessory). System 300 may also include an image recognition module that may perform feature detection and matching to allow for matching and comparison of features imaged by imaging device 350. For example, imaging device 350 may find predetermined features that may correspond to two-dimensional and/or three-dimensional surfaces and/or contours of an object within a field of view of imaging device 350. Also for example, any suitable technique may be used to identify features (e.g., spatial data) of a viewed object (e.g., features of a user and/or accessory) and to match those imaged features to predetermined features provided by system 300 (e.g., or provided by a user). Also for example, optical character recognition of text and/or markings located on a viewed object may be performed. For example, spatial data and/or other data may be determined that may be matched to predetermined data provided by system 300 (e.g., predetermined shapes, colors, text, contours, and other features). For example, the spatial data and/or other data may include data defining points (e.g., or contours) of a user and/or accessory based on an actual image of an object (e.g., the exemplary disclosed accessories, wearable device 355, and/or gesturing object 360) imaged by imaging device 350. For example, spatial and/or data based on viewing an object may be used to match that data to predetermined data to identify points or features of an object being viewed. Any suitable techniques for recognizing objects and/or determining spatial and/or other data of a viewed object may be utilized by system 300 for image recognition via imaging device 350.

Wearable device 355 may be any suitable device for allowing a user to control system 300 based on user actions (e.g., movements and/or gestures). Wearable device 355 may be any suitable motion detection device. Wearable device 355 may be a smart device such as a smart wristband, smart glove, or one or more smart rings that may be worn by a user (e.g., male user 320 or female user 325) and that may communicate with components of system 300 (e.g., male user device 305 and/or female user device 310) via any of the exemplary disclosed communication techniques. Wearable device 355 may include any suitable motion and/or position sensors that may communicate with the exemplary disclosed user devices or any other suitable component of system 300. In at least some exemplary embodiments, wearable device 355 may be detected and/or tracked by imaging device 350 or may operate to sense user actions (e.g., gestures) without imaging device 350.

In at least some exemplary embodiments, gesturing object 360 may be generally similar to wearable device 355 and may be handled by a user (e.g., a smart device that may be handled by male user 320 and/or female user 325). In other embodiments, gesturing object 360 may be a passive object that may be detected and/or tracked by imaging device 350. Gesturing object 360 may be penile-shaped or have any other suitable shape that may be suitable for use in controlling an adult device by user actions or gestures. For example, gesturing object 360 may be formed in the shape of human sexual organs, adult toys, user devices (e.g., smartphones), and/or any other desired object so that users can make corresponding analog sexual stimulation operation through gesturing object 360. For example, users can provide analog actions (e.g., the user's hand-jerking a penis) by holding the smartphone and making a sliding motion along the edge of the touch screen (e.g., for example as illustrated in FIG. 4). For example, the user may hold the smartphone and make a sliding motion along the edge of the touch screen, and according to the movement of the palm on the edge of the touch screen of the smartphone (e.g., the touch screen may detect the movement distance of the user's palm, to simulate the sexual stimulation operation of the user's hand jerking the penis), so that the user can manipulate the exemplary disclosed adult toy without going through specific manipulation buttons or the fixed control elements of the interface (e.g., thus facilitating the user's manipulation of the exemplary disclosed adult toy).

The exemplary disclosed system, apparatus, and method may be used in any suitable application for controlling a device. The exemplary disclosed system, apparatus, and method may be used in any suitable application for controlling an adult device. The exemplary disclosed system, apparatus, and method may be used in any suitable application for controlling an adult device using a user device. The exemplary disclosed system, apparatus, and method may be used in any suitable application for adult entertainment.

Figure 5:
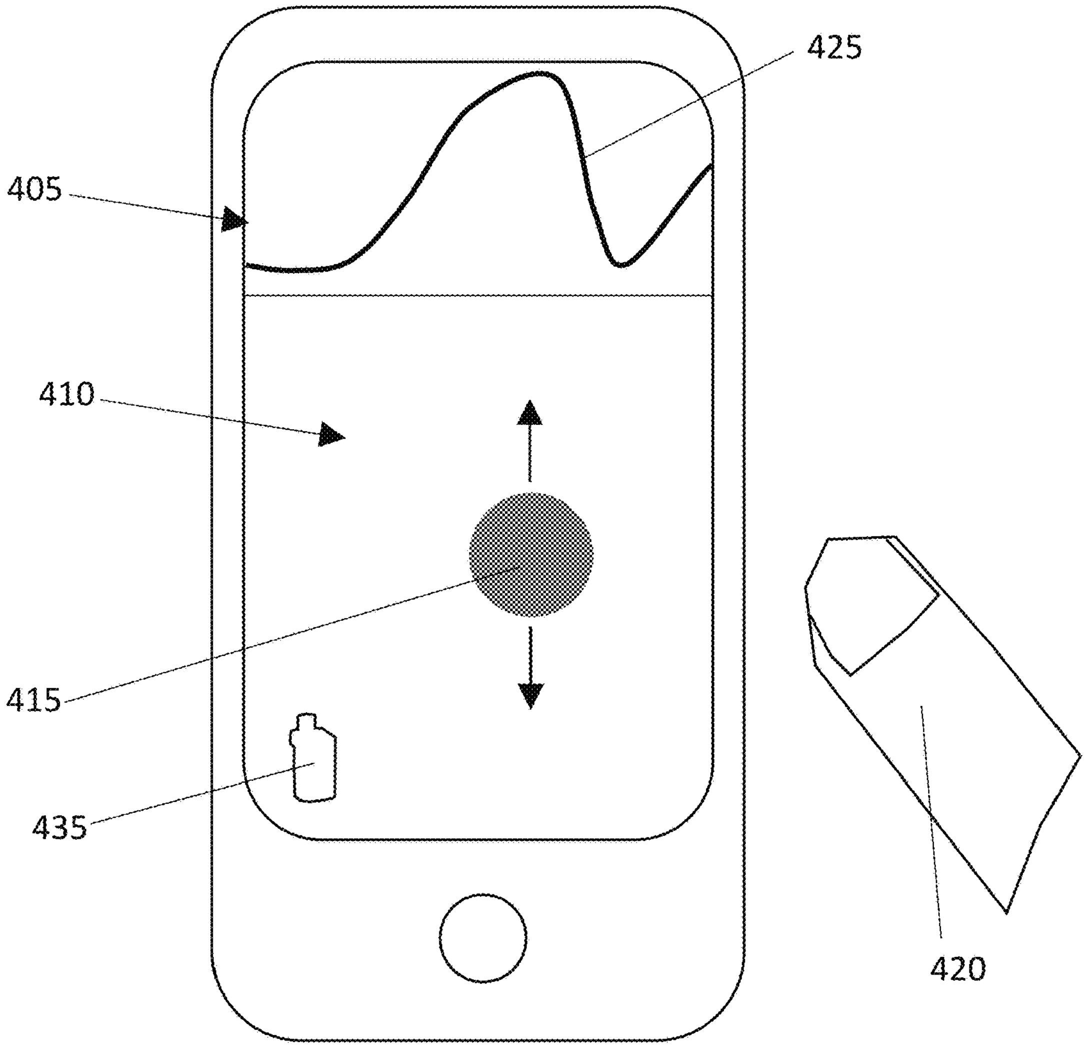
FIG. 5 is a schematic illustration of an exemplary embodiment of the exemplary disclosed system.
Figure 6A:
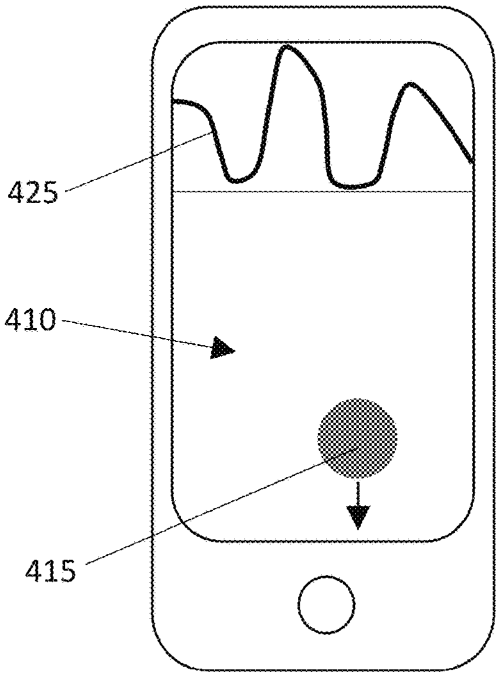
FIGS. 6A and 6B are additional schematic illustrations of the exemplary embodiment of FIG. 5.
Figure 6B:
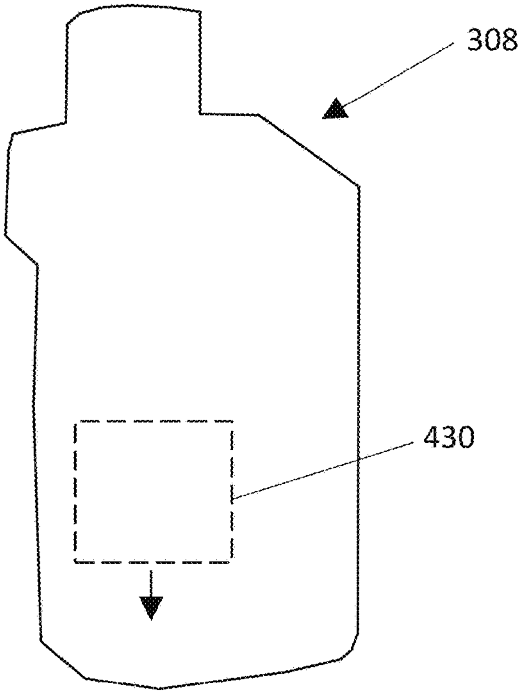
Figure 7A:
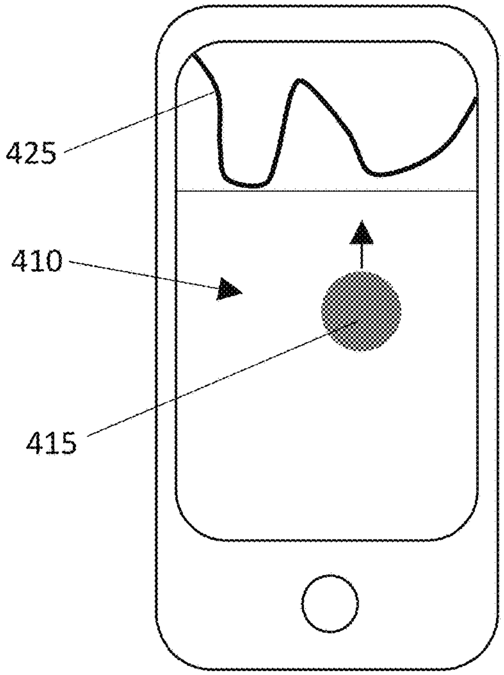
FIGS. 7A and 7B are additional schematic illustrations of the exemplary embodiment of FIG. 5.
Figure 7B:
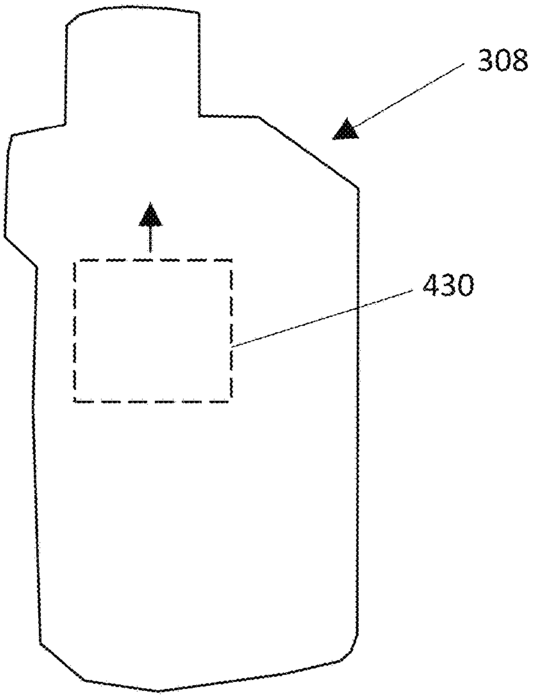

In at least some exemplary embodiments and as illustrated in FIGS. 5 through 7B, system 300 may be used to control a device such as an adult toy via user interaction. The exemplary disclosed user device (e.g., male user device 305 or female user device 310) may display a graphical user interface such as a GUI 405 on a touchscreen of the exemplary disclosed user device to the user (e.g., or a spatial computing interface such as for example similar to Apple Vision Pro and as described herein). GUI 405 may include an operation area 410 on which a user may manipulate an operation control element 415. For example, a user finger 420 may move operation control element 415 up and down (e.g., and/or side to side or in any other desired direction) on operation area 410. The movement of operation control element 415 may be graphically displayed as a control pattern curve 425 (e.g., as displayed by the exemplary disclosed user device for example as illustrated in FIG. 5). As further explained below, a movement of the operation control element 415 may control a movement of stimulation component 430 of the exemplary disclosed adult toy. For example, stimulation component 430 may be used to stimulate a portion of a user's genitalia. In at least some exemplary embodiments, stimulation component 430 may be a penis stimulation component of male accessory 308 for example as illustrated in FIGS. 6B and 7B. For example, when a user's penis is inserted in male accessory 308, system 300 may control a movement of stimulation component 430 to different locations or areas of the user's penis based on movement of stimulation component 430 along a length (e.g., a portion of a length) of male accessory 308. For example, the exemplary disclosed user device (e.g., male user device 305 or female user device 310) may send a control command to controller 319 via communication device 318 of the exemplary disclosed accessory (e.g., male accessory 308 or female accessory 315). The control command may be based on user control of GUI 405 (e.g., user control of operation control element 415). The exemplary disclosed controller (e.g., controller 319) may control an operation of the exemplary disclosed accessory based on the control command.

A user may move operation control element 415 (e.g., drag up and down) on operation area 410 of GUI 405 using user finger 420, which may cause stimulation component 430 to move up and down correspondingly, based on the user's gesture operation in manipulating operation control element 415 (e.g., thereby stimulating a corresponding position of the user's penis). As shown in FIGS. 6A and 7A, when the user drags operation control element 415 up and down in operation area 410 of GUI 405, system 300 (e.g., using the one or more exemplary disclosed modules, processor, and storage) may generate control pattern curve 425. Control pattern curve 425 may include control mode curves corresponding to an amplitude and/or a frequency of movement (e.g., up and down movement) of operation control element 415 by the user (e.g., male user 320 or female user 325), allowing the user to receive as output (e.g., intuitively understand) a current level of stimulation of the adult toy (e.g., male accessory 308). An accessory image 435 of the adult toy (e.g., to identify the adult toy type being used) may also be displayed on GUI 405, for example as illustrated in FIG. 5. GUI 405 of the exemplary disclosed device may display a corresponding toy action process based on the user's movement process (e.g., user actions such as manipulation or gesturing) of operation control element 415. For example, when the user moves (e.g., drags) operation control element 415 on GUI 405 to move upwards, stimulation component 430 of male accessory 308 that stimulates the penis of the user (e.g., male user 320) moves upwards, and control pattern curve 425 also moves upwards on GUI 405 (e.g., allowing male user 320 to intuitively understand the control process of male accessory 308). A similar operation may be performed for downward movement.

The manner in which a user manipulates operation control element 415 may control an operation of the exemplary disclosed adult device. As an example, the parameter type of the action parameter may be configured to be consistent with the parameter type of the associated operation parameter. For example, an operation position of a gesture operation (e.g., a position of operation control element 415) may be related to a sexual stimulation position of the sexual stimulation action on a user's sexual organ. An action amplitude of gesture operation (e.g., an action amplitude or intensity of operation control element 415) may be related to a sexual stimulation amplitude or intensity of the sexual stimulation action on a user's sexual organ. In at least some exemplary embodiments, user actions such as moving operation control element 415 horizontally (e.g., sideways or left and right), repeatedly tapping operation control element 415, and/or pressing relatively hard against operation control element 415 on GUI 405 may control (e.g., increase and/or decrease) a sexual stimulation amplitude or intensity. An action speed of gesture operation (e.g., a speed and/or velocity at which operation control element 415 is moved along GUI 405) may be related to the action speed or frequency of the sexual stimulation action on a user's sexual organ. Also for example, if a finger position of the user moving operation control element 415 on GUI 405 is relatively higher (e.g., higher on operation area 410 and/or greater in pressing intensity), a stimulation (e.g., vibration) may be stronger or faster. Also for example, if the finger position of the user moving operation control element 415 on GUI 405 is relatively lower, the vibration intensity may be weaker or slower.

Figure 13:
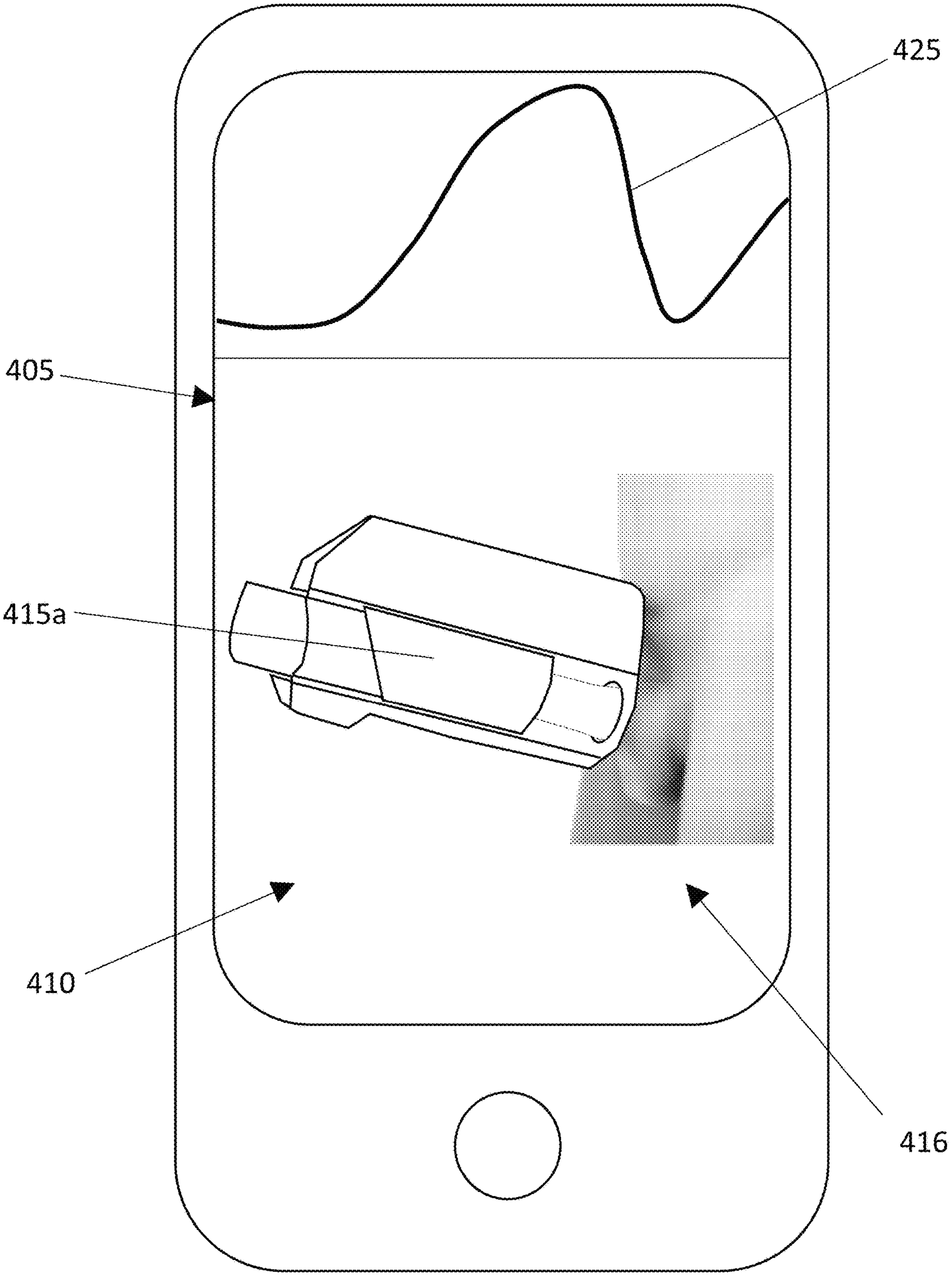
FIG. 13 is a schematic illustration of another exemplary embodiment of the exemplary disclosed system.

Also for example as illustrated in FIG. 13, operation control element 415*a* and a penis (e.g., an animated display) may be displayed on GUI 405 (e.g., the target position may be a fixed penis as displayed on GUI 405). By detecting a sliding position and/or sliding speed of the user's control of operation control element 415*a* relative to the displayed penis on GUI 405 (e.g., of a simulated animation display 416), the adult toy (e.g., male accessory 308) may be controlled by system 300 to stimulate the penis using a corresponding position and/or speed.

Returning to FIGS. 5 through 7B, an up and down drag action of user finger 420 on operation control element 415 may correspond to an up and down sliding action of stimulation component 430 of male accessory 308. Also for example as illustrated in FIGS. 8 through 10B, and opening and closing (e.g., pinching action) of user fingers and/or thumb may correspond to a stimulating action of the two stimulating components of a female adult toy (e.g., female accessory 315) approaching or moving away from each other. For example as illustrated in FIGS. 8 through 10B, two operation controls (e.g., operation control elements 415) may be displayed on GUI 405 (e.g., with one finger of the user operating one operation control element 415 and another finger or thumb operating the other operation control element 415). Based on the operation (e.g., user manipulation) of the two operation control elements 415, the corresponding actions of the adult toy may be controlled. For example, when the user drags and approaches the two controls (e.g., operation control elements 415) on GUI 405, the two ends of the toy (e.g., female accessory 315) may bend and approach. When the user drags and moves the two controls (e.g., operation control elements 415) away from each other on GUI 405, the two ends of the toy (e.g., female accessory 315) may move away from each other.

Figure 8:
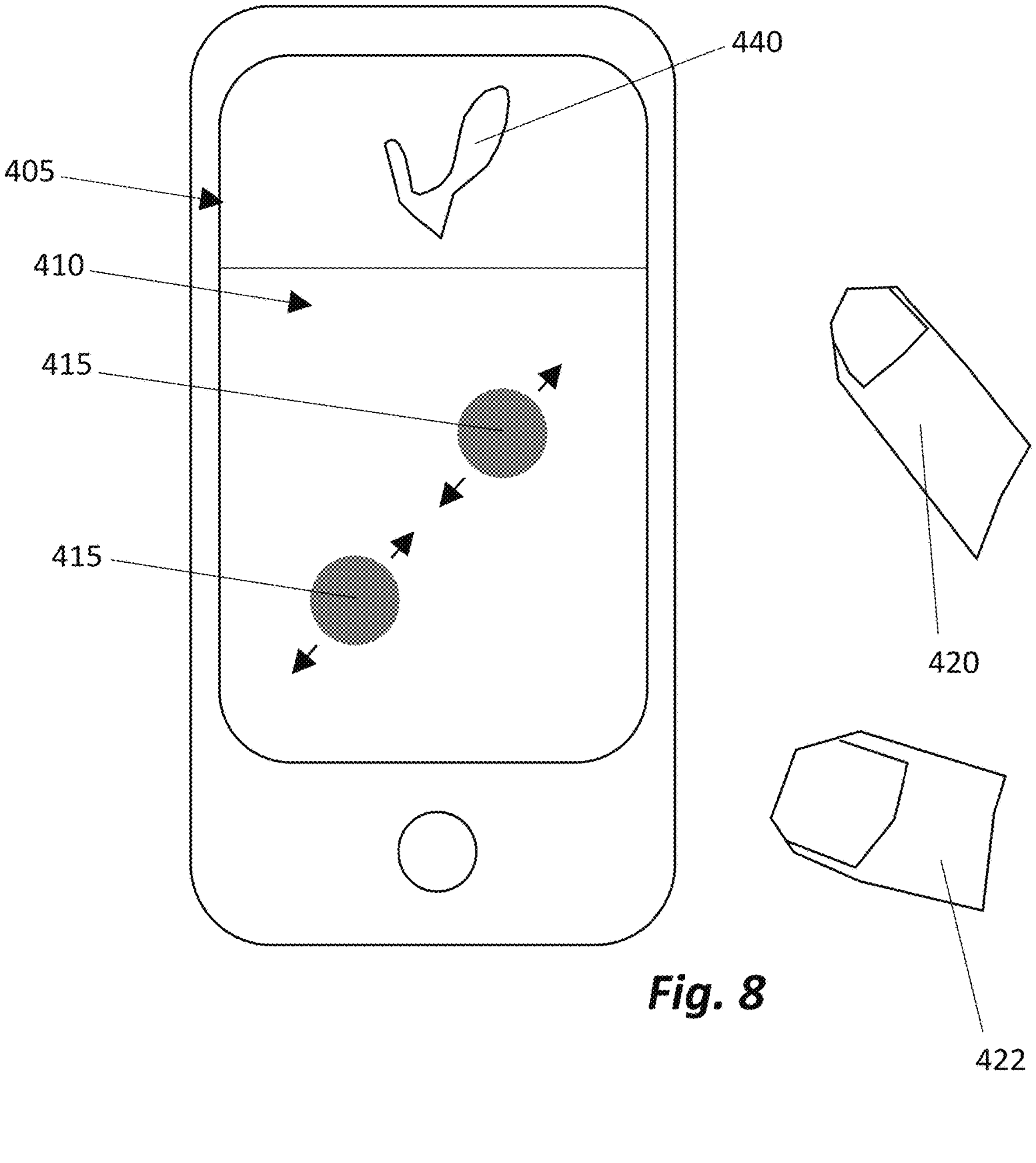
FIG. 8 is a schematic illustration of another exemplary embodiment of the exemplary disclosed system.
Figure 9A:
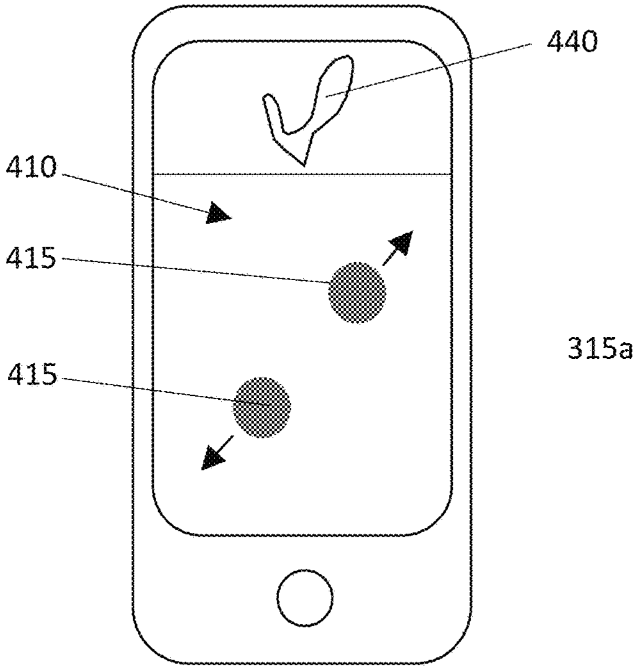
FIGS. 9A and 9B are additional schematic illustrations of the exemplary embodiment of FIG. 8.
Figure 9B:
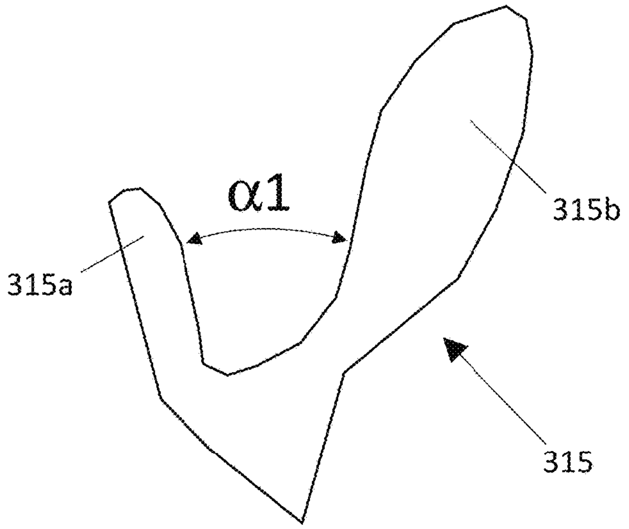
Figure 10A:
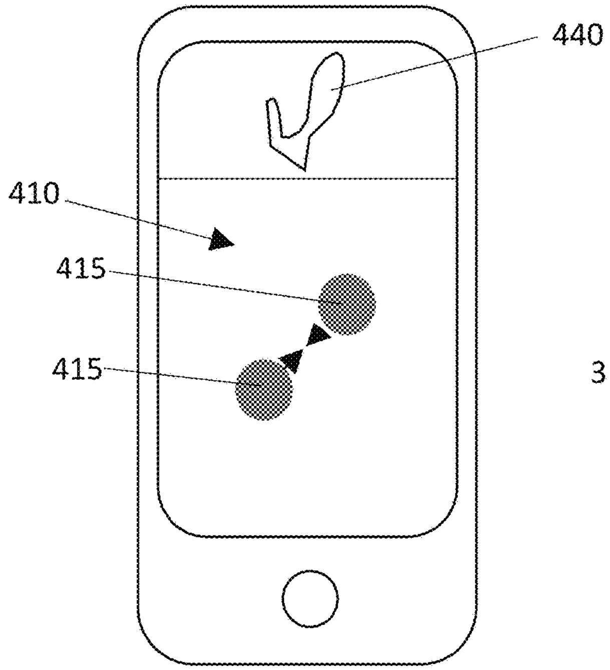
FIGS. 10A and 10B are additional schematic illustrations of the exemplary embodiment of FIG. 8.
Figure 10B:
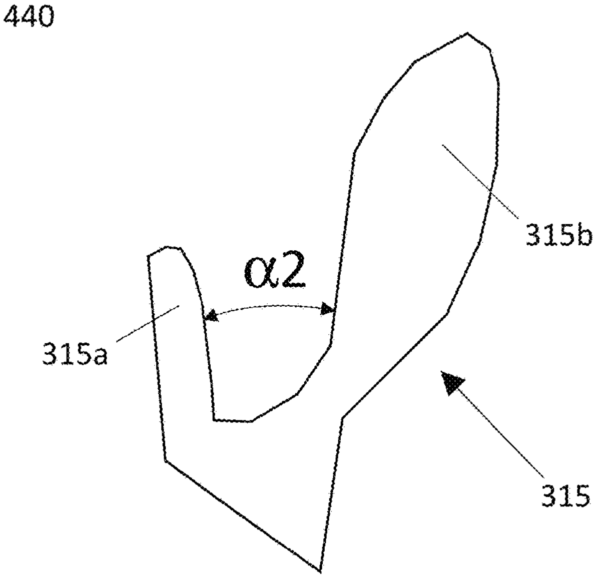

FIGS. 8 through 10B illustrate another exemplary embodiment of the exemplary disclosed system, which may operate generally similarly to the exemplary embodiment illustrated in FIGS. 5 through 7B. As illustrated in FIG. 8, GUI 405 may include a plurality of (e.g., two or more) operation control elements 415 displayed on operation area 410. For example, multiple user digits (e.g., user finger 420 and either a user thumb 422 or another user finger 422) may move operation control elements 415 toward each other and/or away from each other on operation area 410 (e.g., repeatedly toward and away from each other for as many iterations as desired). The movement of operation control elements 415 may correspond to a graphical display of an accessory movement image 440 for example as illustrated in FIGS. 9A and 10A. As further explained below, a movement of the operation control elements 415 may control a movement of an adult toy (e.g., female accessory 315). For example, operation control elements 415 may be moved between a first position relatively farther away from each other (e.g., as illustrated in FIGS. 9A and 9B) and a second position relatively closer to each other (e.g., as illustrated in FIGS. 10A and 10B). For example in the first position illustrated in FIGS. 9A and 9B, first accessory portion 315*a* and second accessory portion 315*b* may be positioned relatively farther from each other so that a relatively greater angle $\alpha 1$ is formed between first accessory portion 315*a* and second accessory portion 315*b* (and accessory movement image 440 may be similarly graphically depicted in FIG. 9A with a relatively greater angle between first and second accessory portions). For example in the second position illustrated in FIGS. 10A and 10B, first accessory portion 315*a* and second accessory portion 315*b* may be positioned relatively closer to each other so that a relatively smaller angle $\alpha 2$ is formed between first accessory portion 315*a* and second accessory portion 315*b* (and accessory movement image 440 may be similarly graphically depicted in FIG. 10A with a relatively smaller angle between first and second accessory portions). Angle $\alpha 1$ may be greater than angle $\alpha 2$. First accessory portion 315*a* and second accessory portion 315*b* (and corresponding operation control elements 415) may also be positioned farther away than the first position illustrated in FIGS. 9A and 9B, closer than the second position illustrated in FIGS. 10A and 10B, and/or at any desired relative distance between the first and second positions. For example as a user iteratively moves operation control elements 415 farther away from and closer to each other, first accessory portion 315*a* and second accessory portion 315*b* may correspondingly be controlled to move, and accessory movement image 440 may be depicted with corresponding movements (e.g., so that a user intuitively understands the positions of the accessory portions, for example as the positions iteratively change). The exemplary disclosed controller may control one or more exemplary disclosed motors and/or actuators described above to move first accessory portion 315*a* and second accessory portion 315*b* toward each other and away based on control by a user via manipulation of operation control elements 415. In at least some exemplary embodiments, first accessory portion 315*a* may be a clitoral stimulation component and second accessory portion 315*b* may be a vaginal stimulation component.

A user (e.g., female user 325) may manipulate operation of (e.g., drag) control elements 415 displayed on GUI 405 of the exemplary disclosed user device (e.g., female user device 310) to move closer or farther away from each other, thereby moving first accessory portion 315*a* and second accessory portion 315*b* correspondingly closer or farther away from each other. Accessory movement image 440 may correspondingly depict proportional changes in distance between the accessory portions so that the user intuitively understands the relative positions of the portions of the adult toy (e.g., female accessory 315).

For example as illustrated in FIGS. 8 through 10B, a user's operation may be followed by system 300 to change the actual sexual stimulation action of the adult toy in real-time or near real-time. For example, the action state of the actual sexual stimulation action of the exemplary disclosed adult toy may be changed according to the change of the operation state of the user's analog sexual stimulation operation, so as to allow the actual sexual stimulation action of the adult toy to be changed in real-time or near real-time in accordance with the user's operation (e.g., and to improve the user's experience of the use of the adult toy). For example, one technique for providing this is using a driving component that is a reversible electric motor for example as described herein. Also for example, a unidirectional motor may be used with any suitable action direction adjusting device (e.g., for adjusting the action direction of the sexual stimulation action of the adult toy at any time). For example as described above regarding FIGS. 8 through 10B, when the user changes the direction of operation of the control on the exemplary disclosed interface, the actual direction of action of the adult toy will change (e.g., immediately change). For example, female accessory 315 (e.g., or female accessory 515) may be controlled using operation control elements 415 for example as described above based on the exemplary disclosed driving member. As an example, as shown in FIGS. 8 to 10B, the reversible electric motor is configured for driving an adult toy to realize the actual sexual stimulation action associated with the user's analog sexual stimulation operation, and the reversible electric motor can change the working direction of the motor in time according to the first control instruction, so as to change the direction of the action of the actual sexual stimulation action of the adult toy in real time or in near-real time, e.g., the first control instruction includes a first working parameter, the first working parameter includes a working current direction of the reversible electric motor, and when the operating direction of the user's analog sexual stimulation operation changes, the working current direction in the first working parameter will follow and change accordingly, so as to change, in real time or in near-real time, the action direction of the actual sexual stimulation action of the adult toy. As another example, in addition to the reversible electric motor being able to change the operating direction of the motor in a timely manner according to the first working parameter in the first control instruction, the reversible electric motor is also able to operate in real-time or near real-time with other working parameter of the motor, such as, for example, working speed of the motor, working stroke, working frequency, and the like, according to the second operating parameter in the first control instruction. When the operating frequency, operating speed, operating stroke, etc. of the analog sexual stimulation operation of the user is changed, the working speed, working stroke, working frequency, etc. in the second working parameter will follow to be changed accordingly, so as to correspondingly change the operating speed, the operating stroke, the operating frequency, etc. of the actual sexual stimulation action of the adult toy in real time or in near real time. As another example, wherein the driving component includes a first electric motor for controlling action direction of the at least one actual sexual stimulation action and a second electric motor for controlling other action parameter of the at least one actual sexual stimulation action, wherein the first working parameter includes at least one of working current direction, working speed, and working stroke, working frequency. For example, the first electric motor may be a reversible electric motor (which may also be a unidirectional motor, the unidirectional motor may be used with any suitable action direction adjusting device, for adjusting the action direction of the sexual stimulation action of the adult toy at any time) and configured to be used exclusively for controlling the action direction of the actual sexual stimulation action, the second electric motor may be a unidirectional motor (which may also be a reversible electric motor) and configured to be used exclusively for controlling other action parameter of the actual sexual stimulation action, such as the action speed, the action stroke, the action frequency, etc.

Figure 11:
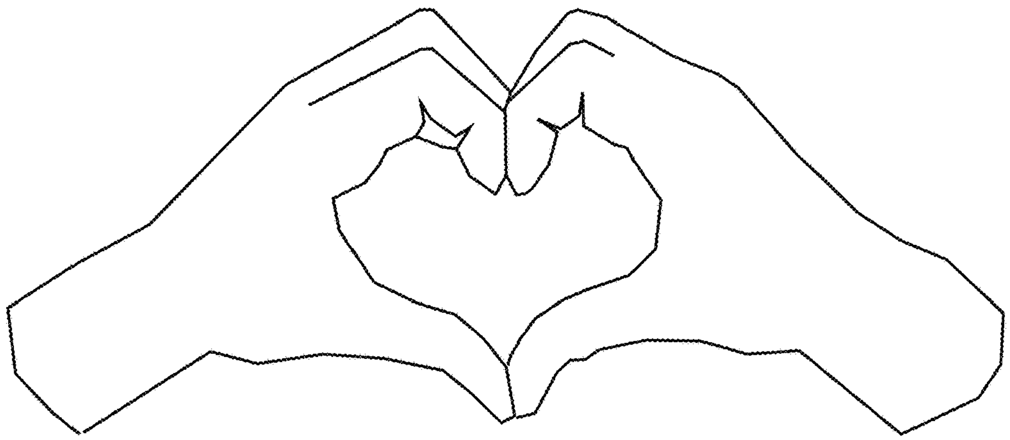
FIGS. 11 and 12 are schematic illustrations of an exemplary embodiment of the exemplary disclosed system.
Figure 12:
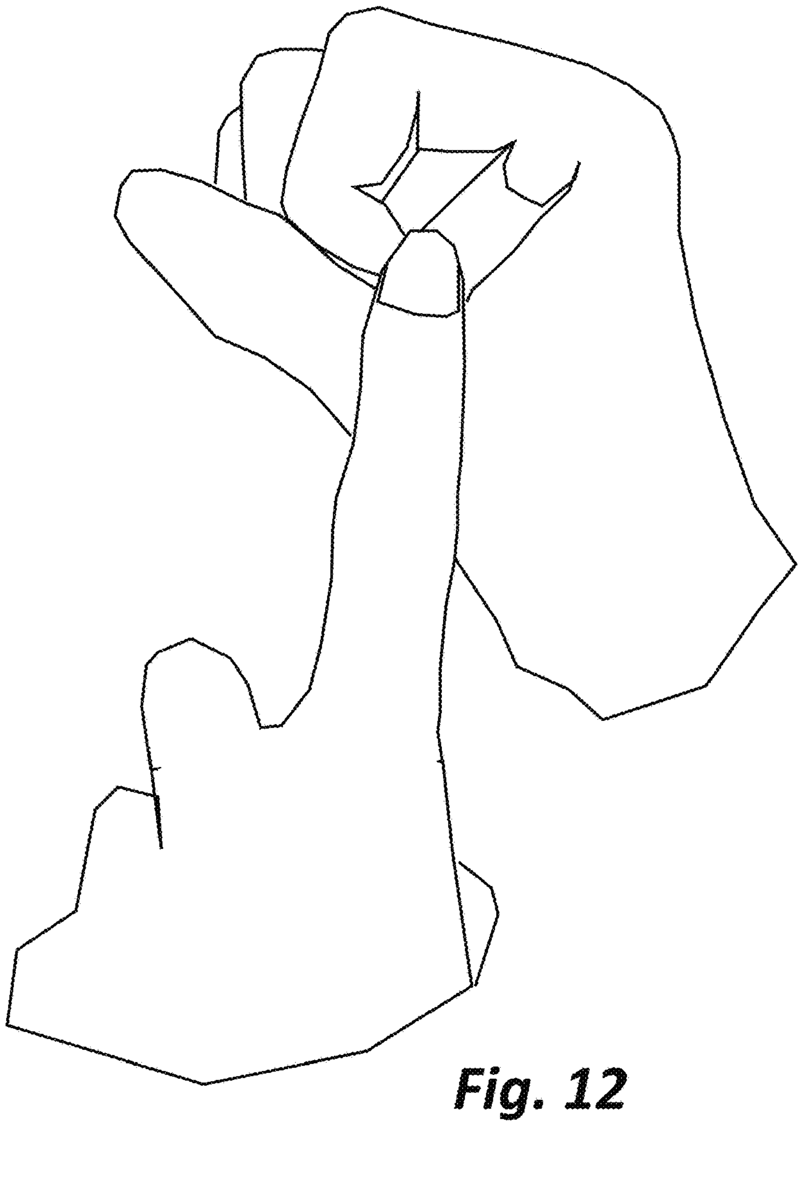

FIGS. 11 and 12 illustrate another exemplary embodiment of the exemplary disclosed system, apparatus, and method. System 300 may control the exemplary disclosed adult toys based on user actions such as, for example, gestures made by one or more user's hands (e.g., or users' hands) as for example illustrated in FIGS. 11 and 12. In at least some exemplary embodiments, such gestures may be identified and recognized by imaging device 350 for example as described above. For example, an analog sexual stimulation operation may be performed by a single user alone or by a combination of two or more users. For example as illustrated in FIG. 12, male user 320 may perform a physical action while female user 325 performs another physical action, such as forming a gesture action of "thrusting" (e.g., such as male user 320 raising his middle or index finger and thrusting towards an O-shaped area formed by a thumb and an index finger of female user 325). After system 300 detects this action (e.g., via imaging device 350), system 300 may control one exemplary disclosed adult toy to perform the corresponding action, or simultaneously control two or more exemplary disclosed adult toys to perform the corresponding actions. Alternatively for example, as illustrated in FIG. 11, a heart-shaped gesture may be formed by fingers or arms of male user 320 and/or female user 325. System 300 may detect this gesture (e.g., via imaging device 350) and may control one exemplary disclosed adult toy to perform a corresponding action (e.g., a predefined action for example that may be input or set by a user), or simultaneously control two or more exemplary disclosed adult toys to perform the corresponding action. As an example, the exemplary disclosed combination gesture may include at least two gestures (e.g., the combination gesture may be made by a user, or it may be made by at least two users cooperating together), and each gesture action in the combination gesture may be used to simulate a different actual sexual stimulation action of the exemplary disclosed adult toy. System 300 may control an adult toy to carry out a different sexual stimulation operation according to each gesture action in the combination gesture. Each gesture action in the combined gesture can also be used to simulate the actual sexual stimulation actions of different adult toys, and the system may control different adult toys to perform corresponding sexual stimulation operations according to each gesture action in the combined gesture. For example, one gesture action in forming a gesture action of "thrusting" may be to raise the middle finger, and another gesture action in forming a gesture action of "thrusting" may be an O-shaped gesture formed by the thumb and the index finger. System 300 may control the insertion depth of the middle finger in the area of the O-shaped gesture according to the insertion frequency and the insertion speed of the middle finger. Depending on the depth, frequency, and/or speed of insertion of the middle finger in the area of the O-shaped gesture, system 300 may control the sexual stimulation stroke, sexual stimulation frequency, and/or sexual stimulation speed of the two exemplary disclosed adult toys. This may increase the playfulness of the control of the adult toys, and may also make the control of the adult toys more intuitive and in line with the user's actual desires.

FIG. 13 illustrates another exemplary embodiment of the exemplary disclosed system, apparatus, and method, which may be similar to the exemplary embodiment described above regarding FIGS. 5 through 7B. GUI 405 may include simulated animation display 416 that may be displayed in operation area 410. In this exemplary embodiment, an operation control element 415*a* that may control system 300 similarly to operation control element 415 may form an animated portion (e.g., an animated element) of simulated animation display 416. For example, user finger 420 may be used to move (e.g., drag) operation control element 415*a* to a desired location of simulated animation display 416, which for example may cause system 300 to move stimulation component 430 to a desired location of male accessory 308 similarly to as described above regarding FIGS. 6A through 7B.

For example in at least some exemplary embodiments and as illustrated in FIG. 13, GUI 405 may display simulated animations of adult toys (e.g., simulated animation display 416). For example as illustrated in FIG. 13, an internal structure of an adult toy (e.g., male accessory 308) and a male penis may be simulated on GUI 405. Operation control element 415*a* may be an animated depiction of stimulation component 430 so that users can move and manipulate operation control element 415*a* relative to simulated animation display 416. In at least some exemplary embodiments, when users move (e.g., drag) operation control element 415*a* back and forth on GUI 405, system 300 simultaneously controls an actual stimulation component (e.g., a penis stimulation component such as stimulation component 430) of the adult toy (e.g., male accessory 308) to slide back and forth and rub against the penis of the user (e.g., male user 320 wearing male accessory 308). The user may thereby better perceive and/or intuitively control a position of the adult toy's stimulation (e.g., on the user's penis).

Referring back to FIG. 4, in at least some exemplary embodiments gesture detection technology (e.g., imaging device 350) may be used to control an adult device. For example, a user may slide a hand up and down along the edge of gesturing object 360 (e.g., or a user device such as male user device 305 or female user device 310 that may serve as a gesturing object) for a predetermined stroke. For example based on this gesturing, system 300 may control stimulation component 430 of male accessory 308 to also slide up and down for a corresponding predetermined stroke. A speed of stimulation component 430 may increase as a speed of user gesturing increases. For example, imaging device 350 may be a spatial computer that may display GUI 405 to a user. For example, if a user is detected dragging a penis stimulation control up and down in operation area 410 of GUI 405 displayed by a spatial computer (e.g., imaging device 350 configured with Apple Vision Pro or a similar spatial computer) or by the exemplary disclosed user devices (e.g., as illustrated in FIG. 5 or 8), working parameters of the driving motor of the penis stimulation component of a male adult toy (e.g., of male accessory 308) may be determined based on the position of each control (e.g., operation control elements 415) during the up and down sliding process.

Also for example, if it is detected that a user is simultaneously dragging the vaginal stimulation control and clitoral stimulation control (e.g., as described above regarding FIGS. 8 through 10B) closer to or away from each other in operation area 410 of imaging device 350 (e.g., a spatial computer similar to Apple Vision Pro) or a mobile interface (e.g., as illustrated in FIG. 5 or 8), the working parameters of the motor of the female adult toy may be determined based on the position or distance between operation control elements 415 (e.g., corresponding to a vaginal stimulation component and a clitoral stimulation component for example as described herein regarding accessory portions 315*a* and 315*b*). The exemplary disclosed motor may be set between the vaginal stimulation component and the clitoral stimulation component (e.g., a single motor configuration of the accessory), and the motor may be used to drive the vaginal stimulation component (e.g., second accessory portion 315*b*) and clitoral stimulation component (e.g., first accessory portion 315*a*) of the female adult toy to approach each other or move away from each other.

Also for example, via a reversible electric motor (e.g., motor 316), the working direction of adult toys may be freely changed according to a desired operation. For example, as shown in FIGS. 2, 9B, and 10B, a female adult toy (e.g., female accessory 315) may have a vaginal stimulation part, a clitoral stimulation part, and a motor. The motor (e.g., motor 316) may be a reversible electric motor that may be arranged between the vaginal stimulation part (e.g., second accessory portion 315*b*) and the clitoral stimulation part (e.g., first accessory portion 315*a*). Through the driving of the motor, the vaginal stimulation part and the clitoral stimulation part may be driven to move closer to and/or away from each other (e.g., any desired number of iterations). Due to the reversible working direction of the motor, the bending direction of the female adult toy may be changed at any time according to the user's desire. Also for example, when the motor (e.g., motor 316) is a one-way motor, a working direction may be changed by any suitable technique to thereby change the direction of motion of the adult toy (e.g., for example, a mechanical steering device may be configured to change the driving direction of the one-way motor, thereby changing the direction of motion of the adult toy).

In at least some exemplary embodiments, when a user operates the exemplary disclosed stimulation controls (e.g., operation control elements 415) in the interactive area (e.g., operation area, for example as displayed by a spatial computer such as Apple Vision Pro or on the exemplary disclosed user devices for example as illustrated in FIGS. 5 and 8), the user may control the drive structure of the adult toy to drive the corresponding stimulation components to perform corresponding sexual stimulation actions. For example, when a user rotates a stimulation control (e.g., operation control element 415) on GUI 405 with their fingers, the user may control the rotatable glans of the adult device (e.g., female adult toy) to follow the rotation. For example, when a user drags a stimulation control (e.g., operation control element 415), the adult device and displays of GUI 405 may operate to provide displays that follow the user's operation trajectory, allowing the user to intuitively see the operation position of the stimulation control for example as described above.

Figure 14:
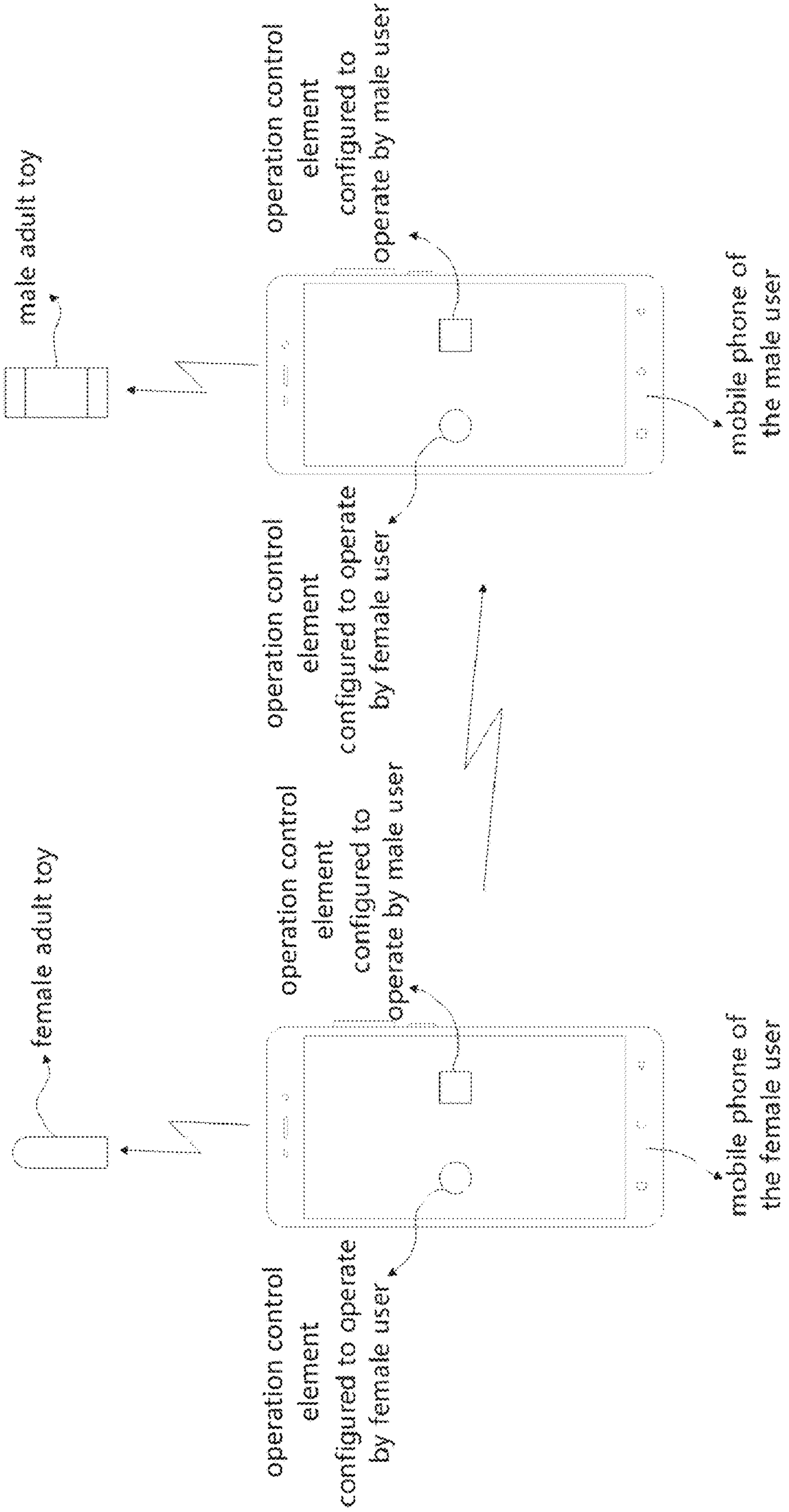
FIG. 14 is a schematic illustration of another exemplary embodiment of the exemplary disclosed system.

FIG. 14 illustrates another exemplary embodiment of the exemplary disclosed system, apparatus, and method. The exemplary disclosed system may include a female toy that may be similar to female accessory 315 and that may be connected to a user device that may be similar to female user device 310, and a male toy that may be similar to male accessory 308 and that may be connected to a user device that may be similar to male user device 305. There may be two or more users, including a local female user using the female user device and accessory, and a remote male user using the male user device and accessory. The user devices may include interfaces (e.g., similar to GUI 405) that may include two operation controls (e.g., similar to operation control elements 415). One operation control may be operated by the female user, and the other operation control may be operated by the male user (e.g., a first operation control element 415 on each user device may be controlled by the female user, and a second operation control element 415 on each user device may be controlled by the male user). During the operation process of the two users, the content of the interfaces of the two users may be transmitted and interacted with in real time or near real-time. According to the operation of different controls on the interfaces by the two users, the action of adult toys for the same user or different users may be controlled. For example, there may be two sexual organ controls on each interface. The local female user may operate the female sexual organ control (e.g., on both user devices), and the remote male user may operate the male sexual organ control (e.g., on both user devices). According to the insertion and withdrawal operations of the two users using the two sexual organ controls (e.g., each controlling their respective operation control element 415 on each device), the toy of each user may be controlled to perform corresponding insertion and withdrawal actions.

In at least some exemplary embodiments, based on a user's gesture operation (e.g., as described herein), an operation of auxiliary device 328 (e.g., a light device, an audio device, and/or a spray device) may be controlled. An ambient light device, an audio device that plays simulated sex sounds, and/or a liquid spray device may be controlled synchronously (e.g., forming a linked control with the exemplary disclosed adult toy to improve the user's experience of using the adult toy). For example, if a male user desires to enhance stimulation of the penis by the male adult toy (e.g., male accessory 308), the frequency of up-and-down sliding of fingers on GUI 405 may be accelerated, with the frequency of up-and-down sliding of stimulation component 430 of the male adult toy also being correspondingly accelerated (e.g., the exemplary disclosed female accessory may be similarly controlled). A flashing frequency of auxiliary device 328 (e.g., an ambient light peripheral) may also become faster and a light color may be more intense (e.g., more dazzling). A heating temperature of the exemplary disclosed heating device (e.g., of auxiliary device 328) of the male adult toy may be higher, and a female voice (e.g., or male voice) played by auxiliary device 328 (e.g., peripheral speaker) may be more shrill and excited.

Figure 15:
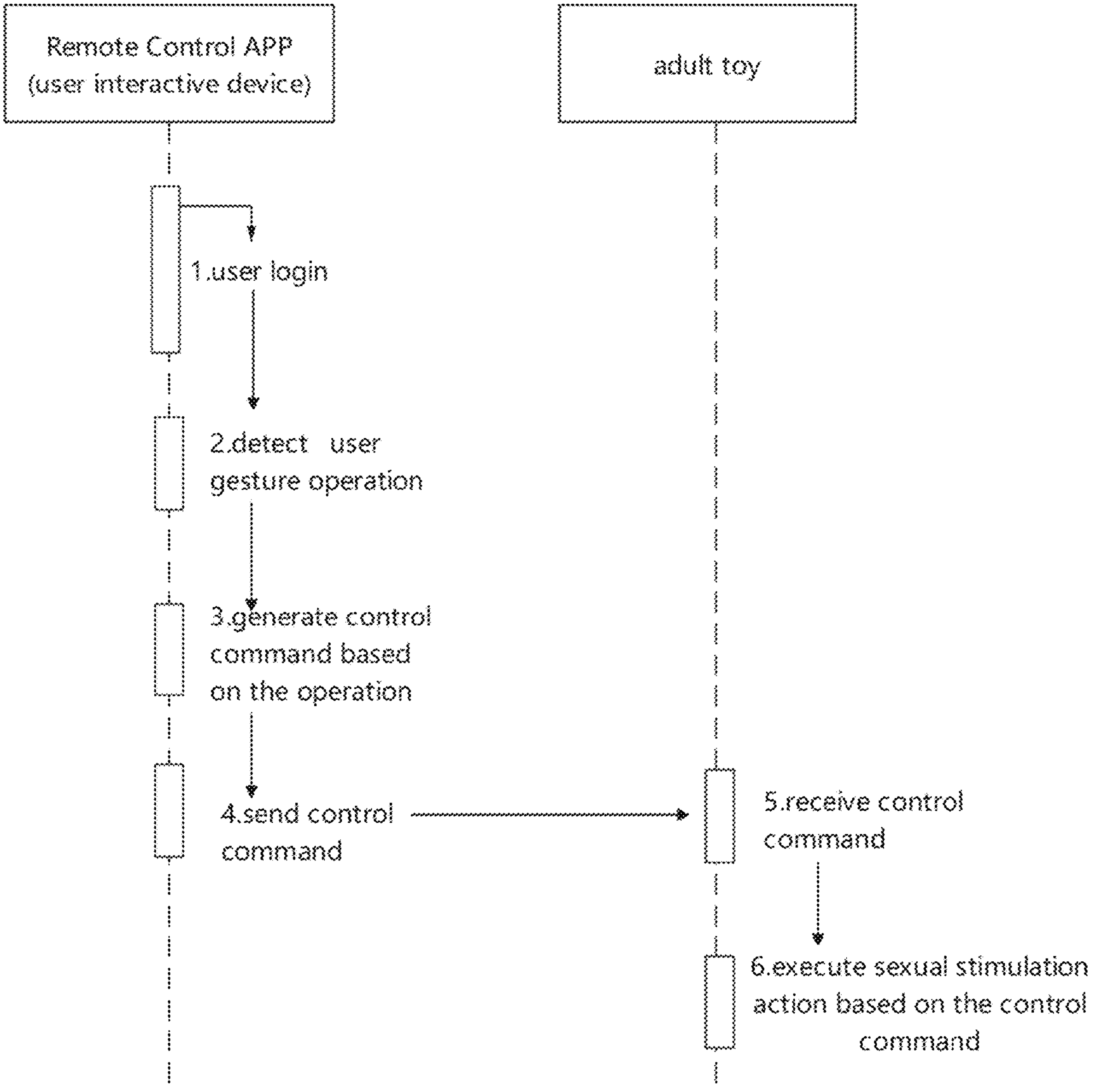
FIG. 15 is a flowchart showing an exemplary process of the present invention.

FIG. 15 illustrates an exemplary operation of the exemplary disclosed system, apparatus, and method. As illustrated in FIG. 15, a user may provide a user login at step 1 using the exemplary disclosed application on any suitable device (e.g., male user device 305 or female user device 310). At step 2, a user gesture operation may be detected using for example any of the exemplary disclosed techniques (e.g., via one or more operation control elements 415 or 415*a*, imaging device 350, wearable device 355, and/or gesturing object 360). At step 3, system 300 may generate a control command based on the gesture operation for example as described above (e.g., regarding FIGS. 1, 2, 12, and 13). At step 4, a control command may be sent for example as described herein (e.g., from male user device 305 and/or female user device 310 to male accessory 308 and/or female accessory 315). At step 5, a control command may be received for example as described herein (e.g., received by male accessory 308 and/or female accessory 315 from male user device 305 and/or female user device 310). At step 6, a sexual stimulation action may be executed (e.g., performed by male accessory 308 and/or female accessory 315) based on the control command.

In at least some exemplary embodiments, a method of interactive control may be implemented by a user interactive device (e.g., male user device 305, female user device 310, imaging device 350 such as the exemplary disclosed spatial computing device, and/or any other exemplary disclosed user interactive device described herein). In response to an analog sexual stimulation operation performed by a user (e.g., via one or more operation control elements 415 or 415*a*, gesturing using imaging device 350, wearable device 355, gesturing object 360, and/or any other exemplary disclosed operation described herein), system 300 may generate a first control command associated with at least one actual sexual stimulation action of an adult toy (e.g., the exemplary described actions for example of male accessory 308 and/or female accessory 315). The analog sexual stimulation operation may be configured as an analog representation (e.g., that may be intuitively related to the operation of the adult toy for example as described herein) of the at least one actual sexual stimulation action of the adult toy. System 300 may send the first control command to the adult toy, the first control command causing the adult toy to follow the analog sexual stimulation operation to perform the corresponding at least one actual sexual stimulation action for example as described in the exemplary embodiments herein.

In at least some exemplary embodiments, an operation parameter of an analog sexual stimulation operation performed by a user (e.g., via one or more operation control elements 415 or 415*a*, gesturing using imaging device 350, wearable device 355, gesturing object 360, and/or any other exemplary disclosed operation described herein) may include at least one of operation position, operation speed, operation distance, operation direction, operation force, operation time, position relationship between current operation position and target position, relative moving speed to target position, distance between two operation positions, relative moving speed between two operation positions, operation stroke on target object, and/or speed on the target object. An action parameter of an actual sexual stimulation action of the exemplary disclosed adult toys (e.g., the exemplary described actions for example of male accessory 308 and/or female accessory 315) may include at least one of sexual stimulation position, action amplitude, stroke distance, action intensity, action speed, and/or action frequency relative to a sexual organ (e.g., of a user of the adult toy).

In at least some exemplary embodiments, the exemplary disclosed system, apparatus, and method may control an adult toy (e.g., male accessory 308 or female accessory 315) to follow and make corresponding actions based on a user's analog operation (e.g., gesture operation, limb action, and/or head action), so that the user may intuitively control the adult toy according to the user's desires. For example as described in the exemplary embodiments above, when a user bends a finger or slides gestures up and down, the adult toy may follow these movements and perform similar actions such as bending or sliding based on the exemplary disclosed operation of system 300. System 300 may thereby leverage a user's natural and/or intuitive hand movements and/or gestures to control the adult toy, which may increase a user's engagement and satisfaction in use of the adult toy (e.g., by providing an intuitive interface that makes an interaction between the user and the toy more seamless and enjoyable).

In at least some exemplary embodiments, an operation position of the exemplary disclosed gesture operation may be related to a sexual stimulation position of a user's sexual organ by a sexual stimulation action of an adult toy (e.g., male accessory 308 or female accessory 315). The action amplitude of gesture operation may be related to the action amplitude or intensity of the sexual stimulation action of the adult toy. The action speed of gesture operation may be related to the action speed or frequency of the sexual stimulation action of the adult toy. For example, if a user's finger position is relatively higher (e.g., relative to GUI 405 in terms or position, intensity, and/or any other suitable manner), an action such as vibration may be stronger or faster. If the user's finger position is relatively lower, the action (e.g., vibration) intensity may be weaker or slower for example as described in the exemplary embodiments above.

In at least some exemplary embodiments, an operation control and a penis may be displayed on GUI 405, for example as illustrated in FIG. 13 (e.g., a target position may be a fixed penis). By detecting a sliding position and/or a sliding speed of the user's control (e.g., operation control element 415*a*) relative to the penis display on GUI 405, an adult toy (e.g., male accessory 308) may be controlled to stimulate (e.g., using the corresponding position or speed) the user's penis using the adult toy. As an example, operation control element 415*a* may be pre-associated with an action implementation structure of the exemplary disclosed adult toy (e.g., male accessory 308), the action implementation structure (e.g., male accessory 308) being configured to implement the corresponding at least one actual sexual stimulation action. The actual implementation structure (e.g., male accessory 308) may be configured to implement the corresponding at least one actual sexual stimulation action. For example, the action implementation structure may be a penis sliding stimulation component of male accessory 308 configured to stimulate the penis by reciprocating along the male user's penis. The display style or type of operation control element 415*a* on GUI 405 may be configured to correspond to the style or type of the penis sliding stimulation component of male accessory 308, so that when the user drags operation control element 415*a* on GUI 405, the penis sliding stimulation component of male accessory 308 moves relative to the penis to achieve stimulation of the penis. For example, a display image of operation control element 415*a* displayed on GUI 405 may be configured as a style or type of a stimulating component of the adult toy (e.g., a sex toy sleeve, a ring, or a pump tube), a style or type of the adult toy (e.g., a penis pump assembly, a wand, a penis ring assembly, or a penis sleeve assembly), or a style or type of a sexual organ (e.g., a penis, vagina, or clitoris).

In at least some exemplary embodiments, there may be two operation control element (e.g., operation control elements 415) on the interface (e.g., GUI 405), with one finger of the user operating one control and the other finger (e.g., or thumb) operating the other control (e.g., as illustrated in FIGS. 8 through 10B). Based on the operation results of the two control elements, the corresponding actions of an adult toy (e.g., female accessory 315) may be controlled. For example, when the user drags and moves the two control elements toward each other on GUI 405, the two ends of the toy may bend and approach each other. When the user drags and moves the two control elements away from each other on GUI 405, the two ends of the toy may open (e.g., move apart).

In at least some exemplary embodiments, the user may slide a hand up and down along the edge of a mobile phone or a gesturing object (e.g., gesturing object 360 such as a penile-shaped object) for a predetermined stroke for example as illustrated in FIG. 4. A penis stimulating component of a male toy (e.g., stimulation component 430) may slide up and down correspondingly for the predetermined stroke. The faster the manual operation of the user proceeds, the faster the penis stimulating component may also slide. Any suitable image recognition technique may be used to detect gesturing for example as described above.

In at least some exemplary embodiments, an up and down drag action of a finger on a control (e.g., operation control element 415) of GUI 405 may correspond to the up and down sliding action of a penis stimulation component (e.g., stimulation component 430) of a male adult toy. Also for example, the opening and pinching action of fingers on control (e.g., operation control elements 415) may correspond to a stimulating action of two stimulating components of a female adult toy approaching or moving away from each other.

In at least some exemplary embodiments, an analog sexual stimulation operation may be performed by a single user alone or by a combination of two users. For example as illustrated in FIG. 12, a male user may perform a physical action while a female user may perform another physical action, for example forming a gesture action of "thrusting" (e.g., such as a male raising his middle or index finger and thrusting towards the O-shaped area formed by the female's thumb and index finger). After detecting this action (e.g., via imaging device 350), system 300 may control one adult toy to perform the corresponding action, or simultaneously control a plurality of (e.g., two) adult toys to perform the corresponding action. Alternatively and for example as illustrated in FIG. 11, upon detection (e.g., via imaging device 350) of a heart-shaped gesture formed by the fingers or arms of a male and those of a female, system 300 may control one adult toy to perform a corresponding action (e.g., a predefined action that may for example be input or set by a user), or simultaneously control a plurality of (e.g., two) adult toys to perform the corresponding action.

In at least some exemplary embodiments, operation area 410 may be a default interaction area set on a screen (e.g., of male user device 305 or female user device 310), an interaction operation area of a spatial computer (e.g., imaging device 350 that may be similar to Apple Vision Pro), or any other suitable area. For example, if a user is detected dragging the penis stimulation control (e.g., operation control element 415 or 415*a*) up and down in the operation area displayed on imaging device 350 to a user (e.g., similar to Apple Vision Pro) or on GUI 405 of male user device 305 or female user device 310, the working parameters of the driving motor (e.g., motor 316) of the penis stimulation component of a male accessory 308 may be determined based on the position of the control (e.g., operation control element 415 or 415*a*) during the up and down sliding process. Also for example, if system 300 detects that a user is simultaneously dragging the vaginal stimulation control and clitoral stimulation control (e.g., operation control elements 415) toward or away from each other in operation area 410 area of GUI 405 (e.g., of a mobile interface or imaging device similar to the Apple Vision Pro), the working parameters of the bending motor (e.g., motor 316) of the female adult toy may be determined based on the position or distance between these two control elements. Among them, the female adult toy may include a vaginal stimulation component and a clitoral stimulation component (e.g., accessory portions 315*a* and 315*b*). The bending motor may be set between the vaginal stimulation component and the clitoral stimulation component, and the bending motor may be used for example to drive the vaginal stimulation.

In at least some exemplary embodiments, any suitable type of working parameters may be associated with the exemplary disclosed motor (e.g., motor 316). For example, working parameters of motor 316 may include combinations of multiple parameter values or single parameter values. For example, a working parameter of motor 316 may include working stroke, working duration, working intensity (e.g., related to vibrational intensity), working power, working force, and/or a combination of these parameters (e.g., both working stroke and working duration or any other suitable combination).

In at least some exemplary embodiments, motor 316 may be a reversible electric motor (e.g., a reversible electric motor). The working direction of the exemplary disclosed adult toys (e.g., male accessory 308 and/or female accessory 315) may be changed (e.g., freely changed) as desired by a user. For example, female accessory 315 may have a vaginal stimulation part, a clitoral stimulation part, and a bending motor. The bending motor may be a reversible electric motor that may be disposed between the vaginal stimulation part and the clitoral stimulation part (e.g., between accessory portions 315*a* and 315*b*). Through driving of the bending motor (e.g., motor 316), the vaginal stimulation part and the clitoral stimulation part may be driven to move closer to and farther away from each other. Due to the reversible working direction of the bending motor, the bending direction of the female adult toy can be changed at any time according to a user's desire. Alternatively for example when the motor (e.g., motor 316) may be a one-way motor, it may be possible to change a working direction of the motor through any suitable technique, thereby changing a direction of motion of the exemplary disclosed adult toy. For example, a mechanical steering device may be set up to change a driving direction of the one-way motor, thereby changing a direction of motion of the exemplary disclosed adult toy.

In at least some exemplary embodiments, when a user operates stimulation control element 415 in operation area 410 of GUI 405 (e.g., the interactive area of imaging device 350 that may be similar to Apple Vision Pro or of GUI 405 of male user device 305 or female user device 310), system 300 may control the drive structure of the exemplary disclosed adult toy to drive corresponding stimulation components to perform corresponding sexual stimulation actions. For example, when a user rotates stimulation control element 415 on GUI 405 with a finger, the user may control the rotatable glans of the female adult toy to follow the rotation. Also for example, when a user drags a stimulation control in the interactive area of imaging device 350 or on the exemplary disclosed user interface, the stimulation control of the adult toy may move by following the operation trajectory of the user's manipulation of the control element (e.g., of GUI 405), allowing the user to intuitively see the operation position of the stimulation control.

In at least some exemplary embodiments, the user interacts with system 300 by performing various gesture operations (e.g., sliding up and down, pinching, and/or any other suitable gesture operations) on the exemplary disclosed graphical user interface (e.g., GUI 405). These user operations may be analog representations of actual stimulation situations or behaviors. For example, the user may indirectly control the movements and functions of the exemplary disclosed adult toy by simulating actual sexual stimulation actions that can occur with the adult toy (e.g., bending and sliding of the penis, approaching or moving away from the female adult toy parts, and/or any other stimulating suitable actions). System 300 may determine commands (e.g., translate the user's analog operation into actual control commands) for the exemplary disclosed adult toy. For example, when the user performs an analog sexual stimulation operation, the adult toy follows the operation with a corresponding actual sexual stimulation action, such as the penis sliding stimulation component of male accessory 308 following the user's operations on GUI 405 by sliding up and down. For example, this following action involving the movements of the adult toy simulate the trajectory, amplitude, speed, and/or any other suitable parameters of the user's simulated operations on the exemplary disclosed interface, forming (e.g., forming a kind of) synchronous simulation of movements. For example through the above analog operation, the actual stimulation action of the adult toy on the user's sexual organs (e.g., vibration, sliding, squeezing, and/or any other suitable action) may simulate the tactile experience of the user that may actually be generated. This simulation focuses on the physical reproduction of the action and also includes the intensity, speed, frequency and other characteristics of the stimulation, in order to effectively simulate the real sensation by the user and thereby provide the user with a realistic sensory simulation. In addition, GUI 405 serves as an interactive interface for user operation, and also provides visual simulation for the user by displaying elements such as images of the adult toy's attachments, control mode curves, images of the movements of the attachments, and/or any other suitable display elements and images. The exemplary disclosed images reflect the motion state of the exemplary disclosed adult toy, the stimulation mode, and the correspondence with the user's operation, thereby helping the user to intuitively understand the current stimulation level and the control process of the exemplary disclosed adult toy (e.g., thereby enhancing the user's cognitive simulation of the relationship between the analog sexual stimulation operation and the actual sexual stimulation action).

In at least some exemplary embodiments, a plurality of users may utilize system 300 (e.g., two users such as a local female user and a remote male user). GUI 405 (e.g., an interface of mobile devices such as mobile devices, e.g., phones, of both the female user and the male user) may display two operation control elements 415 or 415*a*. One operation control may be operated by the female user, and the other operation control may be operated by the male user. During the operation process of the two users, the content of GUI 405 (e.g., the mobile device interfaces of the two users) may be transmitted and interact in real-time or near real-time. According to the operation of different control elements on the interface by the two users, the action of adult toys for the same user or different users may be controlled by system 300. Also for example, there may be two sexual organ control elements on the mobile device interface. The local female user may operate the female sexual organ control, and the remote male user may operate the male sexual organ control (e.g., on each of the devices of the male and female users). According to an insertion and withdrawal operations of the two users using the two sexual organ control elements, the toy of a certain user or both users may be controlled.

In at least some exemplary embodiments, based on a user's exemplary disclosed gesture operations, auxiliary device 328 (e.g., a light device, an audio device, and/or a spray device) may be controlled. For example, an ambient light device, an audio device that plays simulated sex sounds, and/or a liquid spray device may be controlled synchronously, forming a linked control with the adult toy to improve the user's experience of using the adult toy. If a male user desires to enhance stimulation of the penis by a male adult toy, a frequency of up-and-down sliding of fingers on GUI 405 (e.g., of a mobile device) may be accelerated, and the frequency of up-and-down sliding of a penis stimulation component of the male adult toy may also be accelerated. A flashing frequency of the ambient light (e.g., ambient light peripheral) may be faster and a light color may be increasingly dazzling. A heating temperature of a heating device of the male adult toy may be increased, and a female voice played by the audio device (e.g., a peripheral speaker) may become more shrill and excited.

The invention includes other illustrative embodiments ("Embodiments") as follows.

Embodiment 1: A method of interactive control, implemented by a user interactive device, comprising: in response to an analog sexual stimulation operation performed by a user, generating a first control command associated with at least one actual sexual stimulation action of an adult toy; wherein the analog sexual stimulation operation is configured as an analog representation of the at least one actual sexual stimulation action of the adult toy; and sending the first control command to the adult toy, the first control command causing the adult toy to follow the analog sexual stimulation operation to perform the corresponding at least one actual sexual stimulation action.

Embodiment 2: The method of Embodiment 1, wherein at least one operation parameter of the analog sexual stimulation operation is associated with at least one action parameter of the at least one actual sexual stimulation action.

Embodiment 3: The method of Embodiment 2, wherein an action parameter type of the at least one action parameter is configured to be consistent with an operation parameter type of the associated at least one operation parameter.

Embodiment 4: The method of Embodiment 2, wherein: the at least one operation parameter includes at least one of operation position, operation speed, operation distance, operation direction, operation force, operation time, position relationship between current operation position and target position, relative moving speed to target position, distance between two operation positions, relative moving speed between two operation positions, operation stroke on target object, and speed on the target object; and the at least one action parameter includes at least one of sexual stimulation position, action amplitude, stroke distance, action intensity, action speed, and action frequency relative to a sexual organ.

Embodiment 5: The method of Embodiment 1, wherein: the analog sexual stimulation operation includes at least two operation actions, which constitute a combination of operation actions and are associated with a predetermined sexual stimulation action or sexual stimulation action combination of the adult toy.

Embodiment 6: The method of Embodiment 5, wherein: the at least one actual sexual stimulation action includes at least one of sliding friction, vibration, swinging, thrusting, bending, expansion, contraction, opening, closing, and liquid ejection; and each of the single operation action and the at least two operation actions include at least one of single finger action, limb action, and head action.

Embodiment 7: The method of Embodiment 1, wherein, in response to the analog sexual stimulation operation performed by the user, generating the first control command associated with the at least one actual sexual stimulation action of the adult toy includes: in response to a change in an operating parameter of the analog sexual stimulation operation of the user, generating a first control command associated with the at least one actual sexual stimulation action of the adult toy; wherein the first control command includes a first working parameter of a driving component of the adult toy corresponding to the at least one actual sexual stimulation action; wherein the analog sexual stimulation operation is pre-associated with the at least one actual sexual stimulation action of the adult toy, and the at least one actual sexual stimulation action is pre-associated with the driving component of the adult toy, and the driving component is configured to operate at least according to the first working parameter to cause the adult toy to perform the corresponding at least one actual sexual stimulation action; and wherein the first working parameter is configured to undergo a parameter change following a change in the operating parameter, so that the at least one actual sexual stimulation action of the adult toy undergoes an action change in response to the change in the operating parameter under the operation of the driving component.

Embodiment 8: The method of Embodiment 7, wherein the first working parameter includes working current direction.

Embodiment 9: The method of Embodiment 8, wherein the driving component includes a reversible electric motor.

Embodiment 10: The method of Embodiment 8, wherein the first control command also includes a second working parameter of the driving component; wherein, the driving component is further configured to operate in accordance with the first working parameter and the second working parameter to cause the adult toy to perform the corresponding at least one actual sexual stimulation action; wherein, the first working parameter and the second working parameter are both configured to undergo a parameter change following a change in the operating parameter, so that the at least one actual sexual stimulation action of the adult toy undergoes an action change in response to the change in the operating parameter under the operation of the driving component; and wherein, the second working parameter includes at least one of working speed, and working stroke, working frequency.

Embodiment 11: The method of Embodiment 7, wherein the driving component includes a first electric motor for controlling action direction of the at least one actual sexual stimulation action and a second electric motor for controlling other action parameter of the at least one actual sexual stimulation action.

Embodiment 12: The method of Embodiment 1, further comprising: displaying an image of the adult toy on an interactive interface of the user interactive device; and in response to the analog sexual stimulation operation of the user, controlling the image of the adult toy displayed on the interactive interface to follow the analog sexual stimulation operation to perform a sexual stimulation action display.

Embodiment 13: The method of Embodiment 1, wherein: the analog sexual stimulation operation is input by the user through at least one of an interactive interface of the user interactive device, a mouse, a touchpad, and a wearable sensor configured using the user interactive device; or the analog sexual stimulation operation is captured by a camera.

Embodiment 14: The method of Embodiment 1, wherein: the analog sexual stimulation operation is input by the user through an operation control element configured to be displayed on an interactive interface of the user interactive device; and each operation control element is pre-associated with an action implementation structure of the adult toy, the action implementation structure being configured to implement the corresponding at least one actual sexual stimulation action.

Embodiment 15: The method of Embodiment 14, wherein a display image of the operation control element displayed on the interactive interface is configured as a style or type of a stimulating component of the adult toy, a style or type of the adult toy, or a style or type of a sexual organ.

Embodiment 16: The method of Embodiment 14, further comprising: in response to the analog sexual stimulation operation on the interactive interface, controlling the operation control element on the interactive interface to follow the trajectory of the analog sexual stimulation operation.

Embodiment 17: The method of Embodiment 14, further comprising: wherein the operation control element is a plurality of operation control elements including a first operation control element and a second operation control element, and the user interactive device includes a first user interactive device and a second user interactive device; wherein the first operation control element is configured to be associated with a first user operation associated with the first user interactive device; wherein the second operation control element is configured to be associated with a second user operation associated with the second user interactive device; and in response to the analog sexual stimulation operation, generating the first control command associated with the at least one actual sexual stimulation action of the adult toy, including obtaining the analog sexual stimulation operation based on control of the first operation control element on the first user interactive device, obtaining the analog sexual stimulation operation based on control of the second operation control element on the second user interactive device, and in response to the analog sexual stimulation operation of at least one of the first operation control element and the second operation control element, generating the first control command associated with the at least one actual sexual stimulation action of the adult toy.

Embodiment 18: The method of Embodiment 17, wherein the adult toy includes at least one of a first adult toy configured for use by the user, and a second adult toy configured for use by a second user.

Embodiment 19: The method of Embodiment 1, further comprising, after responding to the analog sexual stimulation operation performed by the user: generating a second control command associated with the analog sexual stimulation operation of at least one auxiliary device, the second control command including at least one third working parameter associated with at least one operation parameter of the analog sexual stimulation operation; sending the second control command to the corresponding at least one auxiliary device to cause the at least one auxiliary device to operate based on the third working parameter of the second control command; or controlling the corresponding at least one auxiliary device based on the second control command to operate based on the third working parameter of the second control command.

Embodiment 20: The method of Embodiment 19, wherein: the at least one auxiliary device includes at least one of a peripheral ambient light device, a peripheral audio playback device, a peripheral camera, a lamp configured on the adult toy, an audio playback device configured on the adult toy, a liquid spraying device configured on the adult toy, a heating device configured on the adult toy, and a camera configured on the adult toy; and the third working parameter correspondingly includes at least one of color, brightness or flicker frequency of the ambient light device, volume, frequency or playback rate of the audio playback device, spray volume, spray duration or spray frequency of the liquid spraying device, heating temperature, heating duration or frequency of the heating device, shooting duration, and shooting angle of the camera.

Embodiment 21: An interactive control system, comprising: an interactive control module, comprising computer-executable code stored in non-volatile memory; a memory for storing instructions and a processor for executing the instructions; wherein the computer-executable code, when operating on the processor, causes the system to: in response to an analog sexual stimulation operation performed by a user, generate a first control command associated with at least one actual sexual stimulation action of an adult toy; wherein the analog sexual stimulation operation is configured as an analog representation of the at least one actual sexual stimulation action of the adult toy; and send the first control command to the adult toy, the first control command causing the adult toy to follow the analog sexual stimulation operation to perform the corresponding at least one actual sexual stimulation action.

Embodiment 22: A non-transitory computer-readable storage medium, comprising: machine-readable instructions, the machine-readable instructions, when executed by a processor of a controller, cause the controller to: in response to an analog sexual stimulation operation performed by a user, generate a first control command associated with at least one actual sexual stimulation action of an adult toy; wherein the analog sexual stimulation operation is configured as an analog representation of the at least one actual stimulation action of the adult toy; and send the first control command to the adult toy, the first control command causing the adult toy to follow the analog sexual stimulation operation to perform the corresponding at least one actual sexual stimulation action.

The exemplary disclosed system, apparatus, and method may provide an efficient, convenient, and effective technique for controlling adult devices in a manner that avoids monotony and burden for users. For example, the exemplary disclosed system, apparatus, and method may provide a control technique that avoids monotonous interface interaction operations, thereby making an interaction between users and adult toys more seamless and enjoyable. The exemplary disclosed system, apparatus, and method may also provide a technique for a user to operate an adult toy more intuitively according to the user's desires in view of the action characteristics of the adult toy, thereby improving the user's experience in using the adult toy.

In at least some exemplary embodiments, the exemplary disclosed system, apparatus, and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Figure 16:
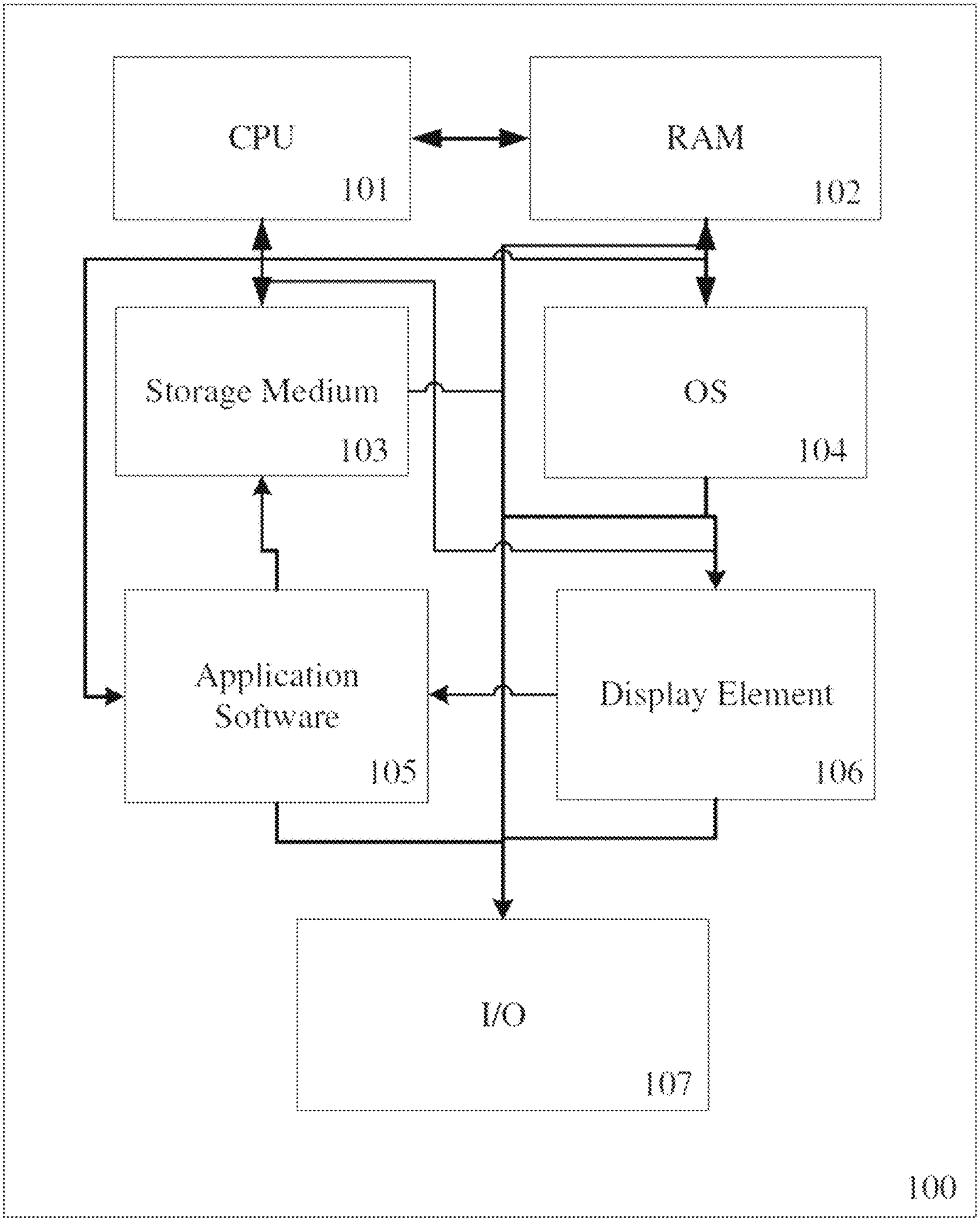
FIG. 16 is a schematic illustration of an exemplary computing device, in accordance with at least some exemplary embodiments of the present disclosure.

An illustrative representation of a computing device appropriate for use with embodiments of the system of the present disclosure is shown in FIG. 16. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 17, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 17:
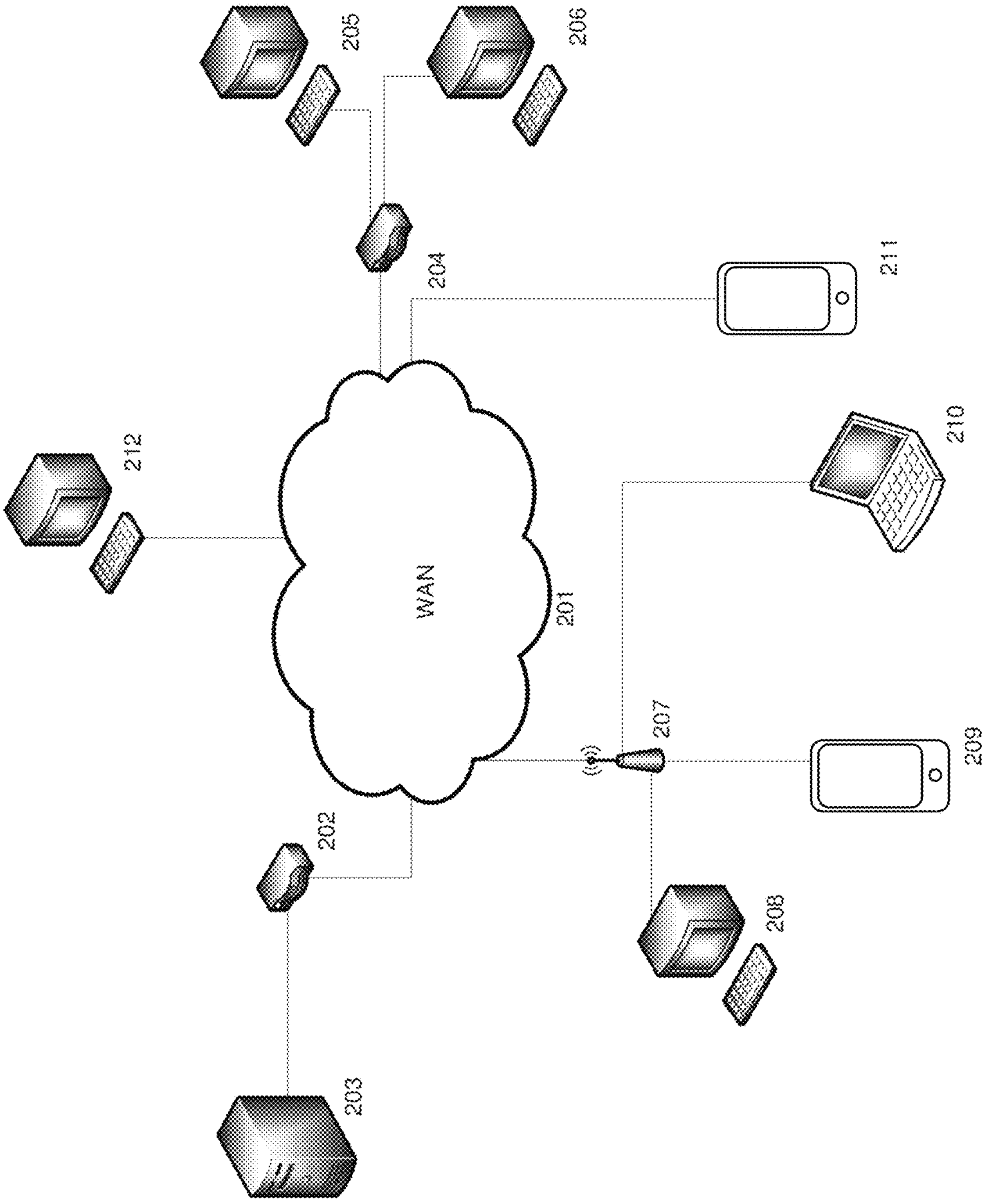
FIG. 17 is a schematic illustration of an exemplary network, in accordance with at least some exemplary embodiments of the present disclosure.

Referring to FIG. 17, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 17, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system, apparatus, and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A method of interactive control, implemented by a user interactive device, comprising:

in response to an operation performed by a user based on moving at least one operation control element displayed on an interactive interface of the user interactive device, generating a first control command associated with at least one actual sexual stimulation action of an adult toy; and sending the first control command to the adult toy, the first control command causing at least one stimulation component of the adult toy to follow the operation to perform the corresponding at least one actual sexual stimulation action to stimulate a sexual organ in real time or near real time;

wherein the at least one operation control element corresponds to and controls a movement of the at least one stimulation component of the adult toy; and wherein moving direction of the at least one stimulation component relative to the sexual organ follows moving direction of the at least one operation control element to change in real time or near real time.

2. The method according to claim 1, wherein at least one operation parameter of the operation is associated with at least one action parameter of the at least one actual sexual stimulation action.

3. The method according to claim 2, wherein an action parameter type of the at least one action parameter is configured to be consistent with an operation parameter type of the associated at least one operation parameter.

4. The method according to claim 2, wherein:

the at least one operation parameter includes at least one of operation position, operation speed, operation distance, operation direction, operation force, operation time, position relationship between operation position and target position, relative moving speed to target position, distance between two operation positions, relative moving speed between two operation positions, operation stroke on target object, and speed on the target object; and the at least one action parameter includes at least one of sexual stimulation position, action direction, action amplitude, stroke distance, action intensity, action speed, and action frequency relative to a sexual organ.

5. The method according to claim 1, wherein the operation includes at least two operation actions, which constitute a combination of operation actions and are associated with a predetermined sexual stimulation action or sexual stimulation action combination of the adult toy.

6. The method according to claim 5, wherein:

the at least one actual sexual stimulation action includes at least one of sliding friction, vibration, swinging, thrusting, bending, expansion, contraction, opening, closing, and liquid ejection; and each of the at least two operation actions includes at least one of single finger action, limb action, and head action.

7. The method according to claim 1, wherein, in response to the operation performed by the user, generating the first control command associated with the at least one actual sexual stimulation action of the adult toy includes:

in response to a change in an operation direction of the operation performed by the user based on changing the moving direction of the at least one operation control element displayed on the interactive interface, generating a first control command associated with the at least one actual sexual stimulation action of the adult toy;

wherein the first control command includes a working current direction of at least one driving component of the adult toy corresponding to the moving direction of the at least one operation control element, the at least one driving component configured to drive the at least one stimulation component;

wherein the operation is pre-associated with the at least one actual sexual stimulation action of the adult toy, and the at least one actual sexual stimulation action is pre-associated with the at least one driving component of the adult toy, and the at least one driving component is configured to operate according to the working current direction to cause the at least one stimulation component of the adult toy to perform the corresponding at least one actual sexual stimulation action to stimulate a sexual organ in real time or near real time; and wherein the working current direction is configured to undergo a direction change following a change in the moving direction of the at least one operation control element, and the at least one actual sexual stimulation action of the adult toy undergoes an action direction change in response to the change in the working current direction of the at least one driving component.

8. The method according to claim 7, wherein the at least one driving component includes a reversible electric motor.

9. The method according to claim 7, wherein the first control command also includes a second working parameter of the driving component;

wherein, the at least one driving component is further configured to operate in accordance with the first working parameter and the second working parameter to cause the adult toy to perform the corresponding at least one actual sexual stimulation action;

wherein, the first working parameter and the second working parameter are both configured to undergo a parameter change following a change in the operating parameter, so that the at least one actual sexual stimulation action of the adult toy undergoes an action change in response to the change in the operating parameter under the operation of the driving component; and wherein, the second working parameter includes at least one of working speed, working stroke, and working frequency.

10. The method according to claim 7, wherein the at least one driving component includes a first electric motor for controlling action direction of the at least one actual sexual stimulation action and a second electric motor for controlling another action parameter of the at least one actual sexual stimulation action.

11. The method according to claim 1, further comprising:

displaying an image of the adult toy on the interactive interface of the user interactive device; and in response to the operation of the user, controlling the image of the adult toy displayed on the interactive interface to follow the operation to perform a sexual stimulation action display.

12. The method according to claim 1, wherein:

the operation is input by the user through the operation control element configured to be displayed on the interactive interface of the user interactive device; and each operation control element is pre-associated with an action implementation structure of the adult toy, the action implementation structure being configured to implement the corresponding at least one actual sexual stimulation action.

13. The method according to claim 12, wherein a display image of the operation control element displayed on the interactive interface is configured as a style or type of a stimulating component of the adult toy, a style or type of the adult toy, or a style or type of a sexual organ.

14. The method according to claim 12, further comprising:

in response to the operation on the interactive interface, controlling the operation control element on the interactive interface to follow a trajectory of the operation.

15. The method according to claim 12, further comprising:

wherein the operation control element is a plurality of operation control elements including a first operation control element and a second operation control element, and the user interactive device includes a first user interactive device and a second user interactive device;

wherein the first operation control element is configured to be associated with a first user operation associated with the first user interactive device;

wherein the second operation control element is configured to be associated with a second user operation associated with the second user interactive device; and in response to the operation, generating the first control command associated with the at least one actual sexual stimulation action of the adult toy, including obtaining the operation based on control of the first operation control element on the first user interactive device, obtaining the operation based on control of the second operation control element on the second user interactive device, and in response to the operation of at least one of the first operation control element and the second operation control element, generating the first control command associated with the at least one actual sexual stimulation action of the adult toy.

16. The method according to claim 1, further comprising, after responding to the operation performed by the user:

generating a second control command associated with the operation of at least one auxiliary device, the second control command including at least one third working parameter associated with at least one operation parameter of the operation;

sending the second control command to the corresponding at least one auxiliary device to cause the at least one auxiliary device to operate based on the third working parameter of the second control command; or controlling the corresponding at least one auxiliary device based on the second control command to operate based on the third working parameter of the second control command.

17. The method according to claim 1, wherein:

the at least one actual sexual stimulation action is performed by the at least one stimulation component of the adult toy by following the operation, wherein the at least one of action position and action direction of the at least one stimulation component follows at least one of the moving position and the moving direction of the at least one operation control element to change in real time or near real time.

18. An interactive control system, comprising:

an interactive control module, comprising computer-executable code stored in non-volatile memory; and a memory for storing instructions and a processor for executing the instructions;

wherein the computer-executable code, when operating on the processor, causes the system to:

in response to an operation performed by a user based on moving at least one operation control element displayed on an interactive interface of a user interactive device, generate a first control command associated with at least one actual sexual stimulation action of an adult toy; and send the first control command to the adult toy, the first control command causing at least one stimulation component of the adult toy to follow the operation to perform the corresponding at least one actual sexual stimulation action to stimulate a sexual organ in real time or near real time;

wherein the at least one operation control element corresponds to and controls a movement of the at least one stimulation component; and wherein moving direction of the at least one stimulation component relative to the sexual organ follows moving direction of the at least one operation control element to change in real time or near real time.

19. The interactive control system of claim 18, wherein:

the at least one operation control element includes a first operation control element and a second operation control element;

moving the first and second operation control elements toward each other causes first and second stimulation components of the at least one stimulation component of the adult toy to move toward each other; and moving the first and second operation control elements away from each other causes the first and second stimulation components of the adult toy to move away from each other.

20. A non-transitory computer-readable storage medium, comprising:

machine-readable instructions, the machine-readable instructions, when executed by a processor of a controller, cause the controller to:

in response to an operation performed by a user based on moving at least one operation control element displayed on an interactive interface of a user interactive device, generate a first control command associated with at least one actual sexual stimulation action of an adult toy; and send the first control command to the adult toy, the first control command causing a stimulation component of the adult toy to follow the operation to perform the corresponding at least one actual sexual stimulation action in real time or near real time;

wherein at least one of action position and action direction of the at least one actual sexual stimulation action follows at least one of moving position and moving direction of the at least one operation control element to change in real time or near real time; and wherein the at least one operation control element is displayed on the interactive interface in a manner that visually indicates a relationship between the at least one operation control element and the stimulation component of the adult toy, with a movement of the at least one operation control element on the interactive interface matching to an actual movement of the stimulation component relative to the adult toy.

* * * * *